US012797736B2

(12) United States Patent
He et al.

(10) Patent No.: US 12,797,736 B2
(45) Date of Patent: Nov. 17, 2026

(54) UPDATING GAMEPLAY PARAMETERS BASED ON PARAMETERS SHOWN IN GAMEPLAY VIDEO

(71) Applicant: Tencent Technology (Shenzhen) Company Limited, Shenzhen (CN)

(72) Inventors: Jingjing He, Shenzhen (CN); Meng Qiu, Shenzhen (CN); Dancheng Zou, Shenzhen (CN); Boyi Liu, Shenzhen (CN); Yu Deng, Shenzhen (CN); Jieqi Xie, Shenzhen (CN); Weijian Cui, Shenzhen (CN); Cong Tian, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 357 days.

(21) Appl. No.: 18/376,181

(22) Filed: Oct. 3, 2023

(65) Prior Publication Data

US 2024/0024778 A1 Jan. 25, 2024

Related U.S. Application Data

(63) Continuation of application No. PCT/CN2022/137533, filed on Dec. 8, 2022.

(30) Foreign Application Priority Data

Mar. 15, 2022 (CN) ......................... 202210252145.5

(51) Int. Cl.
*A63F 13/55* (2014.01)
*A63F 13/86* (2014.01)
(Continued)

(52) U.S. Cl.
CPC .............. *A63F 13/55* (2014.09); *A63F 13/86* (2014.09); *G06T 17/00* (2013.01); *G06V 10/44* (2022.01);
(Continued)

(58) Field of Classification Search
None
See application file for complete search history.

(56) References Cited

U.S. PATENT DOCUMENTS 11,458,388 B1 * 10/2022 Kestell .................... A63F 13/42
2014/0187323 A1 * 7/2014 Perry ...................... A63F 13/21
463/31

FOREIGN PATENT DOCUMENTS

CN 107029429 A 8/2017
CN 110870975 A 3/2020
CN 112351302 A 2/2021

OTHER PUBLICATIONS

International Search Report issued Feb. 23, 2023 in Application No. PCT/CN2022/137533, pp. 1-5.
(Continued)

*Primary Examiner* — Lawrence S Galka
(74) *Attorney, Agent, or Firm* — ARENTFOX SCHIFF LLP

(57) ABSTRACT

A parameter processing method includes playing a video for a second account, wherein a first account controls a first virtual object in the virtual scene in the video, and displaying a first parameter policy set associated with the video. The first parameter policy set includes at least one of (i) position, size, or function of keys for controlling the first virtual object or (ii) sensitivity of virtual props in the virtual scene. The method further includes updating a second parameter policy set corresponding to a second account in response to a parameter policy update operation. Updated parameters of
(Continued)

the second parameter policy set include at least one parameter that is the same as a parameter of the first parameter policy set.

20 Claims, 11 Drawing Sheets

(51) Int. Cl.
*G06T 17/00* (2006.01)
*G06V 10/44* (2022.01)
*G06V 10/46* (2022.01)
*G06V 10/74* (2022.01)
*G06V 10/80* (2022.01)

(52) U.S. Cl.
CPC .......... *G06V 10/462* (2022.01); *G06V 10/761* (2022.01); *G06V 10/806* (2022.01)

(56) References Cited

OTHER PUBLICATIONS

Office Action received for Chinese Patent Application No. 202210252145.5, mailed on Mar. 9, 2026, 20 pages (10 pages of English Translation and 10 pages of Original Document).

* cited by examiner

UPDATING GAMEPLAY PARAMETERS BASED ON PARAMETERS SHOWN IN GAMEPLAY VIDEO

RELATED APPLICATIONS

This application is a continuation of International Application No. PCT/CN2022/137533, filed on Dec. 8, 2022, which claims priority to Chinese Patent Application No. 202210252145.5, filed on Mar. 15, 2022. The disclosures of the prior applications are hereby incorporated by reference in their entirety.

FIELD OF THE TECHNOLOGY

This application relates to human-machine interaction technologies, including a parameter processing method and apparatus for a virtual scene, an electronic device, a computer-readable storage medium, and a computer program product.

BACKGROUND OF THE DISCLOSURE

Display technologies based on graphics processing hardware expand the channels of perceiving environment and obtaining information. Especially, the multimedia technology of virtual scene, with the help of human-machine interaction engine technology, can implement diversified interaction between virtual objects controlled by users or artificial intelligence according to actual application requirements, and has various typical application scenarios, for example, can simulate the battle process between virtual objects in virtual scenes such as games.

User accounts can control virtual objects in virtual scenes, and the control process is implemented based on configured parameters, including various key position parameters, sensitivity parameters, and the like. In the related art, players can upload their own parameter policies and automatically generate corresponding key position codes for sharing, so that other players can input the shared key position codes to replace their current parameter policies. In the related art, other players can only manually input key position codes or manually adjust key positions. As a result, the parameter configuration efficiency is low and the performance effect of parameter configuration is insufficiently intuitive.

SUMMARY

Embodiments of this disclosure provide a parameter processing method and apparatus for a virtual scene, an electronic device, a computer-readable storage medium, and a computer program product, which can improve the parameter policy configuration efficiency by updating a parameter policy associated in a video.

In an embodiment, a parameter processing method for a virtual scene includes playing a video in a human-machine interaction interface of a second account, wherein a first account controls a first virtual object in the virtual scene in the video. The method further includes displaying a first parameter policy set associated with the video, the first parameter policy set comprising at least a parameter policy set by the first account. The parameter policy includes plural parameters including at least one of (i) position, size, or function of keys for controlling the first virtual object in the human-machine interaction interface or (ii) sensitivity of virtual props in the virtual scene. The method further includes updating a second parameter policy set corresponding to the second account based on at least one of the plural parameters of the first parameter policy set in response to a parameter policy update operation. Updated parameters of the second parameter policy set include at least one of (i) position, size, or function of keys for controlling a second virtual object in the virtual scene that are the same as the position, size, or function of keys for controlling the first virtual object or (ii) sensitivity of virtual props in the virtual scene that is the same as the sensitivity of the first parameter policy set.

In an embodiment, a parameter processing method for a virtual scene includes playing a video in a human-machine interaction interface of a second account, the video comprising an interaction process in which a first account controls a first virtual object in the virtual scene. The video is associated with a first parameter policy set comprising at least a parameter policy set by the first account. The parameter policy comprises a plurality of parameters including at least one of (i) position, size, or function of keys for controlling the first virtual object in the human-machine interaction interface or (ii) sensitivity of virtual props in the virtual scene. The method further includes updating a second parameter policy set corresponding to the second account based on at least one set of parameter policies in the first parameter policy set in response to a parameter policy update operation. Parameter policies in the second parameter policy set including at least one of (i) position, size, or function of keys for controlling the second virtual object in the virtual scene or (ii) sensitivity of virtual props in the virtual scene, and the updating comprising replacing at least one set of local parameter policies in the second parameter policy set based on at least one set of parameter policies in the first parameter policy set, or adding the at least one set of parameter policies in the first parameter policy set to the second parameter policy set.

In an embodiment, a parameter processing apparatus for a virtual scene includes processing circuitry configured to play a video in a human-machine interaction interface of a second account, wherein a first account controls a first virtual object in the virtual scene in the video. The processing circuitry is further configured to display a first parameter policy set associated with the video, the first parameter policy set comprising at least a parameter policy set by the first account. The parameter policy comprising plural parameters including at least one of (i) position, size, or function of keys for controlling the first virtual object in the human-machine interaction interface or (ii) sensitivity of virtual props in the virtual scene. The processing circuitry is further configured to update a second parameter policy set corresponding to the second account based on at least one of the plural parameters of the first parameter policy set in response to a parameter policy update operation. Updated parameters of the second parameter policy set include at least one of (i) position, size, or function of keys for controlling a second virtual object in the virtual scene that are the same as the position, size, or function of keys for controlling the first virtual object or (ii) sensitivity of virtual props in the virtual scene that is the same as the sensitivity of the first parameter policy set.

The embodiments of this disclosure have the following beneficial effects:

By playing the video including the interaction process in which the first account controls the first virtual object in the virtual scene in the human-machine interaction interface, the control skill of the first account can be shared with the second account, and the first parameter policy set associated with the video can be displayed during playing of the video, which is convenient for the second account to learn the parameter setting mode of the first account. By associating the parameter policy with the video, the role that the parameter policy can play in the interaction process can be effectively reflected. The second parameter policy set corresponding to the second account is updated based on at least one set of parameter policies in the first parameter policy set in response to the parameter policy update operation, and the parameter policy update operation can help the second account directly obtain the parameter policy of the first account, thereby improving the parameter configuration efficiency.

DESCRIPTION OF EMBODIMENTS

Figure 1:
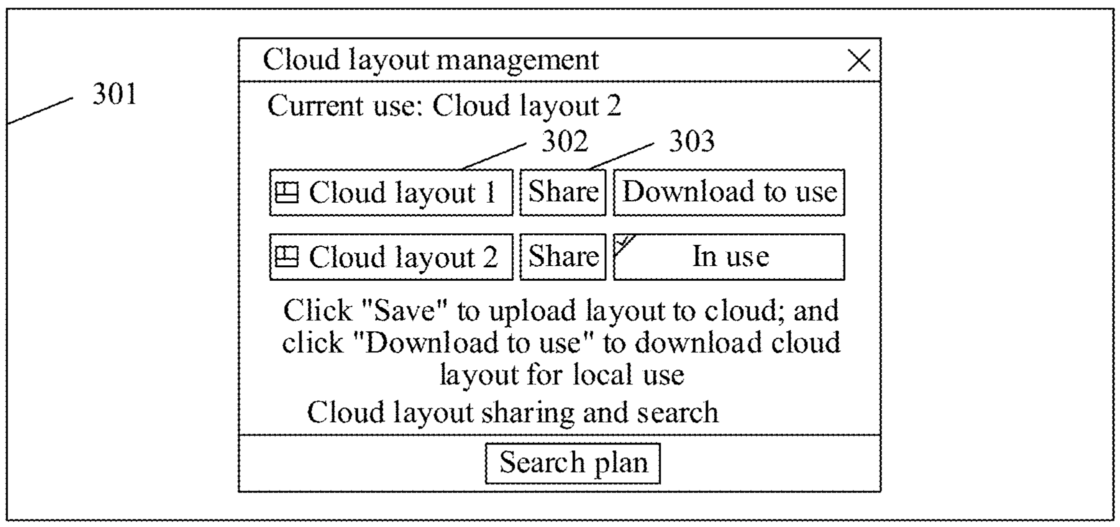
FIG. 1 is a schematic interface diagram of a parameter policy in the related art.

To make the objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art shall fall within the protection scope of this disclosure.

In the following description, the term "some embodiments" describes subsets of all possible embodiments, but it can be understood that "some embodiments" may be the same subset or different subsets of all the possible embodiments, and can be combined with each other without conflict.

In the following description, the term "first/second/third" is only to distinguish similar objects and does not represent a particular order for objects. It can be understood that "first/second/third" may be interchanged in a particular order or priority order when permitted, so that the embodiments of this disclosure described herein can be implemented in an order other than that illustrated or described herein.

Unless otherwise defined, meanings of all technical and scientific terms used in this specification are the same as those usually understood by a person skilled in the art to which this disclosure belongs. The terms used herein are for the purpose of describing the embodiments of this disclosure only and are not intended to limit this disclosure.

Before the embodiments of this disclosure are further described in detail, a description is made on nouns and terms in the embodiments of this disclosure, and the nouns and terms in the embodiments of this disclosure are applicable to the following explanations.

1) Virtual scene: A scene different from the real world and outputted by using devices. Visual perception for the virtual scene, for example, two-dimensional images outputted by the display screen and three-dimensional images outputted by three-dimensional display technologies such as stereo projection, virtual reality, and augmented reality technologies, can be formed with the help of naked eyes or devices. In addition, various perceptions simulating the real world, such as auditory perception, tactile perception, olfactory perception, and motion perception, can be formed through various possible hardware.

2) In response to: Used for indicating a condition or state on which the performed operation depends. The performed one or more operations may be real-time or may have a set delay when the dependent condition or state is met. Unless specifically stated, there is no restriction on the order of the plurality of performed operations.

3) Client: An application program running in a terminal to provide various services, for example, a game client.

4) Virtual object: An object for interacting in the virtual scene, which is controlled by a user or a robot program (for example, a robot program based on artificial intelligence) and can rest, move, and perform various actions in the virtual scene, for example, various characters in a game.

5) Cloud storage is a new concept extended and developed from the concept of cloud computing. It refers to a system that integrates a large number of different types of storage devices in the network through application software to work together and provide data storage and service access functions to the outside world through the cluster application, grid technology, or distributed file system. When the computing and processing core of the cloud computing system is the storage and management of a large amount of data, a large number of storage devices need to be configured in the cloud computing system, so that the cloud computing system is transformed into a cloud storage system. Therefore, the cloud storage is a cloud computing system with data storage and management as the core.

6) Key position: Key position is used for representing the attributes of keys set by players in the human-machine interaction interface, and the attributes include position, size, and function. For example, a virtual shooting key is configured at a certain position A on the human-machine interaction interface, and the size of the virtual shooting key is 2 square centimeters. Because different players have different operation habits, the key position in the game belongs to configurable parameters and can be adjusted individually.

7) Sensitivity: Sensitivity is used for representing the sensitivity of virtual props and virtual objects in the virtual scene. For example, different sensitivities of aiming lenses can bring different virtual shooting effects. For example, different sensitivities of virtual objects can bring different action limits. Because different players have different operation habits, the sensitivity in the game belongs to configurable parameters and can be adjusted individually.

8) Parameter policy: Parameter policy is a set of configuration solutions of control parameters. The control parameters include at least key position, sensitivity, and the like. The configuration solutions of control parameters include configuration data corresponding to each control parameter. For example, when the control parameter is key position, the configuration data includes specific positions, specific sizes, and specific functions of keys.

FIG. 1 is a schematic interface diagram of a parameter policy in the related art. A configured parameter policy can be obtained in response to a configuration operation of a player for each control parameter. The parameter policy can be uploaded to a cloud server (that is, a cloud layout solution is formed) in response to a saving operation for the parameter policy. Two cloud layout solutions 302 and a sharing control 303 are displayed in a human-machine interaction interface 301. Key position codes are automatically generated in response to a trigger operation for the sharing control 303, and shared with other players. The parameter policy corresponding to the key position codes can replace the parameter policy currently owned by the player in response to an operation of other players inputting the key position codes.

In the related art, players can view a tutorial video, and players can manually configure parameters or synchronize the parameter policy from other players through the key position codes. However, in the related art, the parameter policy and tutorial video are not associated and bound. When implementing the embodiments of this disclosure, the applicant found that: First, it is difficult for players in the related art to intuitively and clearly know the actual effect that the parameter policy can achieve, which is not conducive to exerting the application effect of the parameter policy. Second, it is difficult to obtain the parameter policy applied in the tutorial video during viewing the tutorial video in the related art, and players can only manually adjust the parameters after exiting the video playing process. Therefore, it is difficult for players to obtain the parameter policy applied in the tutorial content in real time during viewing the tutorial video. To sum up, the parameter configuration efficiency in the related art is low and the performance effect of parameter configuration is insufficiently intuitive.

The embodiments of this disclosure provide a parameter processing method and apparatus for a virtual scene, an electronic device, a computer-readable storage medium, and a computer program product, which can improve the parameter policy configuration efficiency by updating a parameter policy associated in a video. The following describes an exemplary application of the electronic device provided in the embodiments of this disclosure. The electronic device provided in the embodiments of this disclosure may be implemented as various types of user terminals such as notebook computer, tablet computer, desktop computer, set-top box, mobile device, and vehicle terminal (for example, mobile phone, portable music player, personal digital assistant, special message device, or portable game device).

In order to more easily understand the parameter processing method for a virtual scene provided in the embodiments of this disclosure, an exemplary implementation scenario of the parameter processing method for a virtual scene provided in the embodiments of this disclosure is first described. The virtual scene may be outputted entirely based on terminal output or based on cooperation between the terminal and the server.

In some embodiments, the virtual scene may be an environment for game characters to interact, for example, for game characters to fight in the virtual scene, and both parties can interact in the virtual scene by controlling the actions of virtual objects, thereby enabling users to relieve life pressure during the game.

Figure 2:
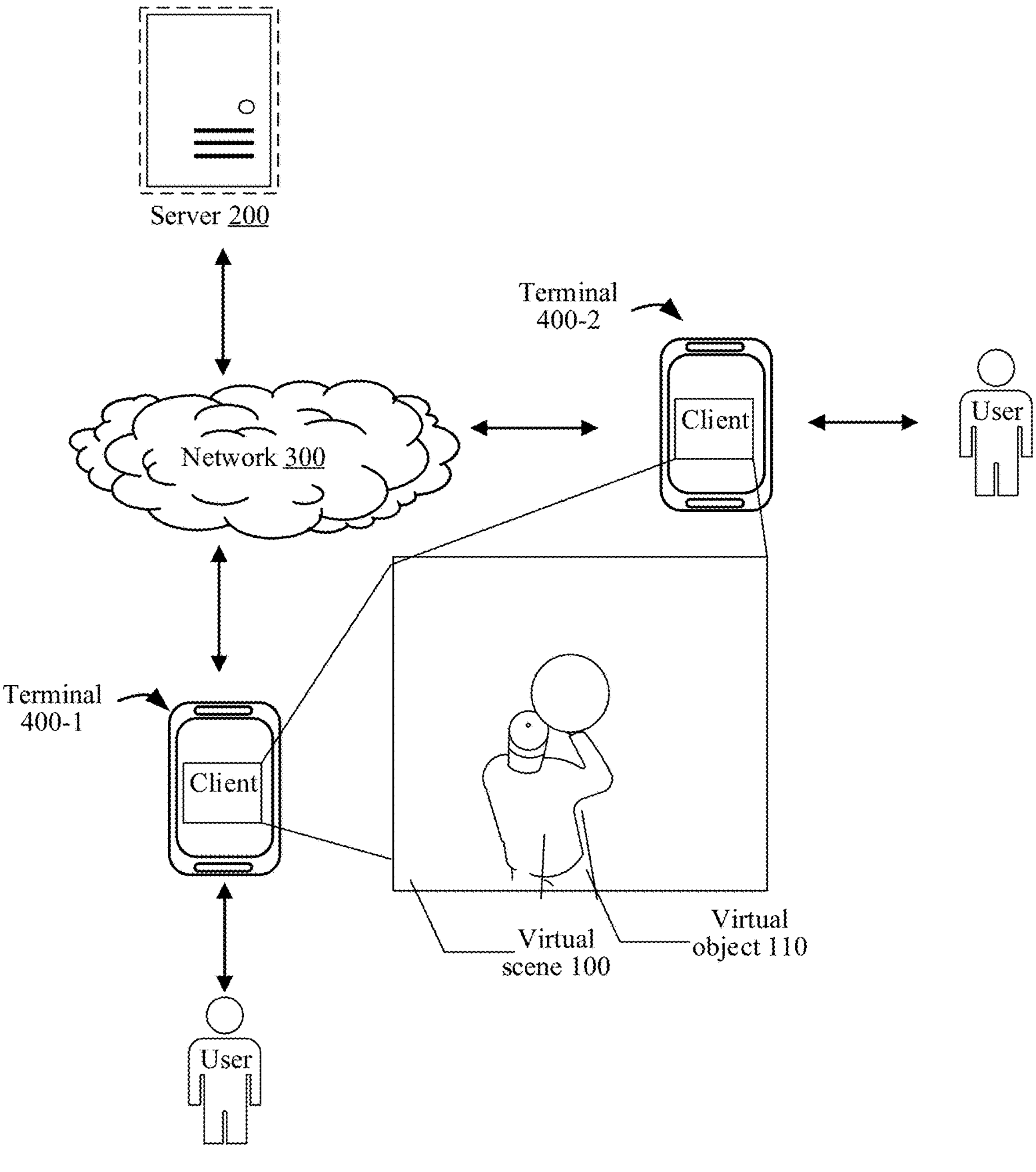
FIG. 2 is a schematic diagram of an application mode of a parameter processing method for a virtual scene according to an embodiment of this disclosure.

In another implementation scenario, FIG. 2 is a schematic diagram of an application mode of a parameter processing method for a virtual scene according to an embodiment of this disclosure. The method is applied to a terminal 400-1, a terminal 400-2, and a server 200. Generally, the method is suitable for completing virtual scene calculation depending on the computing power of the server 200 and outputting the application mode of the virtual scene at the terminal 400-1 and the terminal 400-2.

Using the visual perception forming the virtual scene 100 as an example, the server 200 calculates the display data related to the virtual scene and transmits the data to the terminal 400-1 and the terminal 400-2. The terminal 400-1 and the terminal 400-2 complete the loading, analysis, and rendering of the calculated display data depending on the graphics computing hardware, and output the virtual scene depending on the graphics output hardware to form the visual perception. For example, a two-dimensional video frame can be presented on the display screen of a smartphone, or a video frame achieving the three-dimensional display effect can be projected on the lenses of augmented reality/virtual reality glasses; For the perception of the form of the virtual scene, it can be understood that the corresponding hardware output of the terminal can be used. For example, the auditory perception can be formed by using the microphone output, and the tactile perception can be formed by using the vibrator output.

As an example, a first account logs in to a first client (for example, a network version of game application) run by the terminal 400-1. The first client performs game interaction with other users by connecting to a game server (that is, the server 200). The first client controls a virtual object 110 to interact with other virtual objects or virtual props in the virtual scene 100 in response to a user operation of the first account. The first client transmits operation data to the server 200 through a network 300. The server 200 calculates display data of the operation based on the information, and transmits the display data to the first client. The first client completes the loading, analysis, and rendering of the calculated display data depending on the graphics computing hardware, and outputs the virtual scene depending on the graphics output hardware to form visual perception, that is, displays an interaction process of the virtual object 110 in the virtual scene 100. The first client further transmits a video including the interaction process and a parameter policy applied in the interaction process to the server 200 through the network 300. The server 200 transmits the video including the interaction process and the parameter policy applied in the interaction process to a second client. The second client is a client logged in by the second account and running in the terminal 400-2. The video and the parameter policy associated with the video are played in a human-machine interaction interface of the second client. The parameter policy includes a plurality of parameters for controlling a first virtual object in a human-machine interaction interface of the first client. The second client receives a parameter policy update operation of the second account, the second client transmits a parameter policy update request to the server 200, and the server 200 transmits the parameter policy to the second client, so that the second client updates a second parameter policy set corresponding to the second account based on the parameter policy.

In some embodiments, the terminal 400-1 and the terminal 400-2 may implement the parameter processing method for a virtual scene provided in the embodiments of this disclosure by running a computer program. For example, the computer program may be a native program or a software module in an operating system; or may be a native application (APP), that is, a program that needs to be installed in the operating system to run, such as a game APP (that is, the above client) and a livestreaming APP; or may be an applet, that is, a program that can be run only by being downloaded to a browser environment; or may be a game applet that can be embedded into any APP. In a word, the computer program may be any form of application program, module, or plug-in.

The embodiments of this disclosure may be implemented by means of cloud technology. Cloud technology is a hosting technology of unifying a series of resources such as hardware, software, and network in a wide area network or a local area network to implement data calculation, storage, processing, and sharing.

Cloud technology is the general name of network technology, information technology, integration technology, management platform technology, and application technology based on cloud computing business model application, which can form a resource pool, be used according to needs, and be flexible and convenient. Cloud computing technology will become an important support. Backend services of the technical network system need a lot of computing and storage resources.

As an example, the server 200 may be an independent physical server, a server cluster including a plurality of physical servers or a distributed system, or a cloud server providing basic cloud computing services such as cloud service, cloud database, cloud computing, cloud function, cloud storage, network service, cloud communication, middleware service, domain name service, security service, CDN, and big data and artificial intelligence platform. The terminal 400-1 and the terminal 400-2 may be smartphone, tablet computer, notebook computer, desktop computer, smart speaker, smartwatch, or the like, but are not limited thereto. The terminal 400-1, the terminal 400-2 and the server 200 may be connected directly or indirectly in a wired or wireless communication manner. This is not limited in the embodiments of this disclosure.

Figure 3:
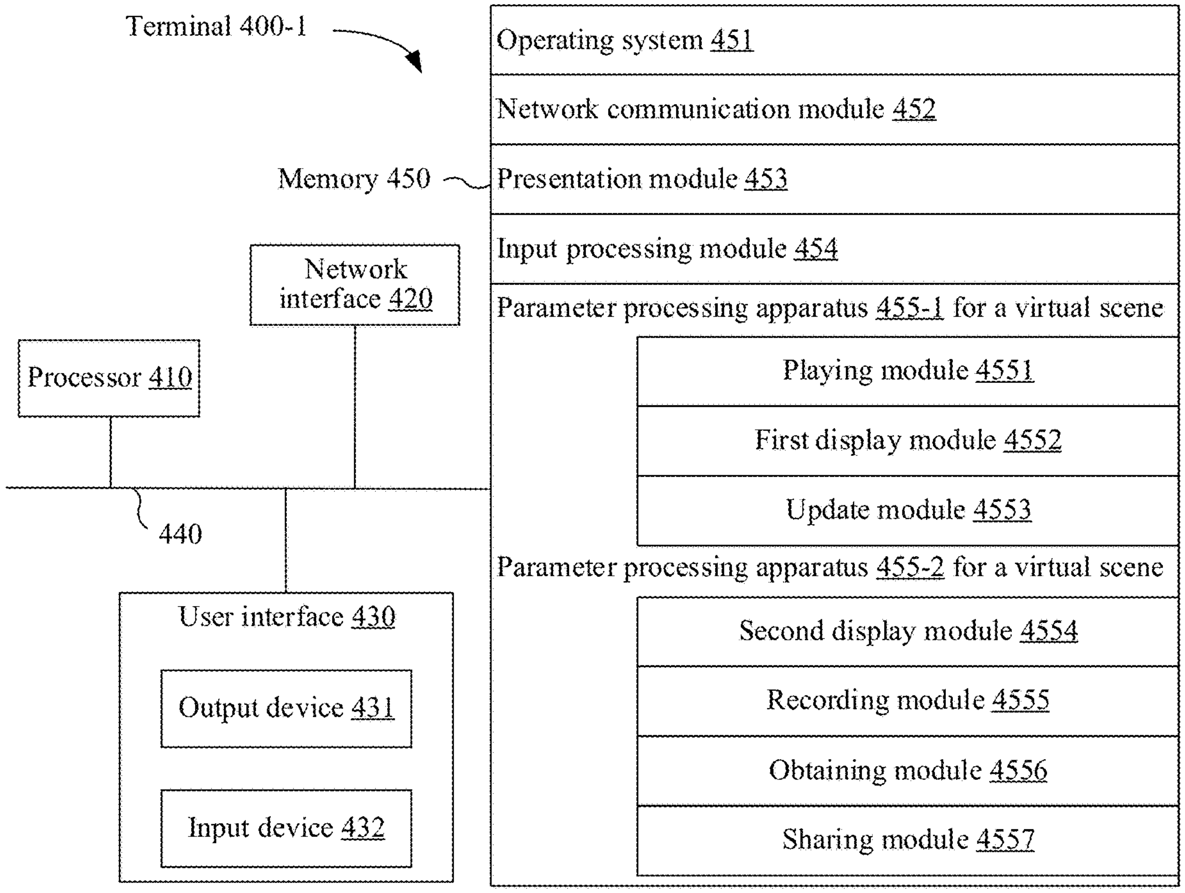
FIG. 3 is a schematic structural diagram of an electronic device to which a parameter processing method for a virtual scene is applied according to an embodiment of this disclosure.

FIG. 3 is a schematic structural diagram of an electronic device to which a parameter processing method for a virtual scene is applied according to an embodiment of this disclosure. Using the electronic device being a terminal as an example, the terminal 400-1 shown in FIG. 3 includes: at least one processor 410 (processing circuitry), a memory 450 (non-transitory computer-readable storage medium), at least one network interface 420, and a user interface 430. The components in the terminal 400-1 are coupled together by using a bus system 440. It can be understood that, the bus system 440 is configured to implement connection and communication between the components. In addition to a data bus, the bus system 440 further includes a power bus, a control bus, and a state signal bus. But, for ease of clear description, all types of buses in FIG. 3 are marked as the bus system 440.

The processor 410 may be an integrated circuit chip with signal processing capabilities, such as a general purpose processor, a digital signal processor (DSP), or other programmable logic devices, discrete gates or transistor logic devices, or a discrete hardware component. The general purpose processor may be a microprocessor or any processor.

The user interface 430 includes one or more output devices 431 that can present media content, including one or more speakers and/or one or more visual displays. The user interface 430 further includes one or more input devices 432, including user interface components that facilitate user input, such as a keyboard, mouse, microphone, touch screen display, camera, and other input buttons and controls.

The memory 450 may be removable, non-removable, or a combination thereof. Exemplary hardware devices include solid-state memories, hard disk drives, optical disk drives, and the like. The memory 450 may include one or more storage devices that are physically located remotely from the processor 410.

The memory 450 may be a volatile memory or a non-volatile memory, or may include both a volatile memory and a non-volatile memory. The non-volatile memory may be a read-only memory (ROM), and the volatile memory may be a random access memory (RAM). The memory 450 described in the embodiments of this disclosure aims to include any other suitable type of memory.

In some embodiments, the memory 450 is capable of storing data to support various operations, and examples of the data include programs, modules, and data structures or subsets or supersets thereof. An exemplary description is provided below.

An operating system 451 includes system programs for processing various basic system services and performing hardware-related tasks, such as a framework layer, a core library layer, and a driver layer, for implementing various basic services and processing hardware-based tasks;

A network communication module 452 is configured to reach other electronic devices through one or more (wired or wireless) network interfaces 420. An exemplary network interface 420 includes: Bluetooth, Wireless Compatibility Authentication (WiFi), and Universal Serial Bus (USB).

A presentation module 453 is configured to present information (for example, a user interface for operating peripherals and displaying content and information) through one or more output devices 431 (for example, a display screen and a speaker) associated with the user interface 430.

An input processing module 454 is configured to detect one or more user inputs or interactions from one of the one or more input devices 432 and to translate the detected inputs or interactions.

In some embodiments, the parameter processing apparatus for a virtual scene provided in the embodiments of this disclosure may be implemented in a software manner. FIG. 3 shows a parameter processing apparatus 455-1 for a virtual scene stored in the memory 450, which may be software in the form of programs and plug-ins, including the following software modules: a playing module 4551, a first display module 4552, and an update module 4553. FIG. 3 further shows a parameter processing apparatus 455-2 for a virtual scene stored in the memory 450, which may be software in the form of programs and plug-ins, including the following software modules: a second display module 4554, a recording module 4555, an obtaining module 4556, and a sharing module 4557. These modules are in logic and therefore can be arbitrarily combined or further split according to the achieved functions. The functions of the modules are described below.

The parameter processing method for a virtual scene provided in the embodiments of this disclosure is described in combination with the exemplary application and implementation of the terminal provided in the embodiments of this disclosure.

Figure 4A:
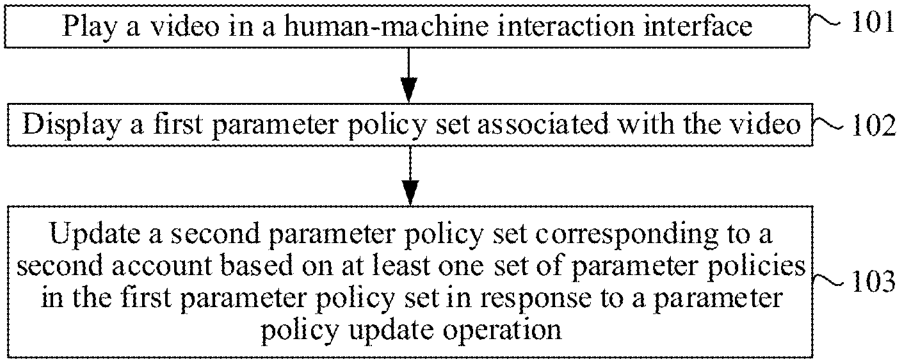
FIG. 4A to FIG. 4D are schematic flowcharts of a parameter processing method for a virtual scene according to an embodiment of this disclosure.

FIG. 4A is a schematic flowchart of a parameter processing method for a virtual scene according to an embodiment of this disclosure. Descriptions are provided in combination with step 101 to step 103 shown in FIG. 4A.

The method shown in FIG. 4A may be performed by various forms of computer programs run by the terminal 400 and is not limited to the above client such as the operating system 451, software modules, and scripts above. Therefore, the client is not to be considered as limitation to the embodiments of this disclosure. In the following example, the virtual scene is used for a game, but is not to be regarded as limitation to the virtual scene.

Step 101. Play a video in a human-machine interaction interface. For example, a video is played in a human-machine interaction interface of a second account, where a first account controls a first virtual object in the virtual scene in the video.

As an example, the human-machine interaction interface in step 101 to step 103 is a human-machine interaction interface corresponding to a second account, and the video includes an interaction process in which a first account controls a first virtual object in the virtual scene. The interaction process is a game battle process, and the video is a live video or a recorded video. For example, screen recording is performed in the process in which the first account logs in to the game client and performs the game battle, and the video obtained from the real-time screen recording is transmitted to the server, so that the video can be played in the human-machine interaction interface of the second account. For example, screen recording is performed in the process in which the first account logs in to the game client and performs the game battle, and after the game battle ends, the video obtained from the screen recording is transmitted to the server, so that the video can be played in the human-machine interaction interface of the second account.

Step 102. Display a first parameter policy set associated with the video. For example, a first parameter policy set associated with the video is displayed. The first parameter policy set includes at least a parameter policy set by the first account, where the parameter policy includes plural parameters including at least one of (i) position, size, or function of keys for controlling the first virtual object in the human-machine interaction interface or (ii) sensitivity of virtual props in the virtual scene.

As an example, the first parameter policy set includes at least a parameter policy set by the first account, the parameter policy includes a plurality of parameters for controlling a first virtual object in a human-machine interaction interface of the first account, the first parameter policy set may further include parameter policies set by other accounts except the first account, the parameter policies include key position setting, sensitivity setting, and the like applied in the interaction process, and each set of parameter policies may include only key position setting, only sensitivity setting, or both key position setting and sensitivity setting.

Figure 4B:
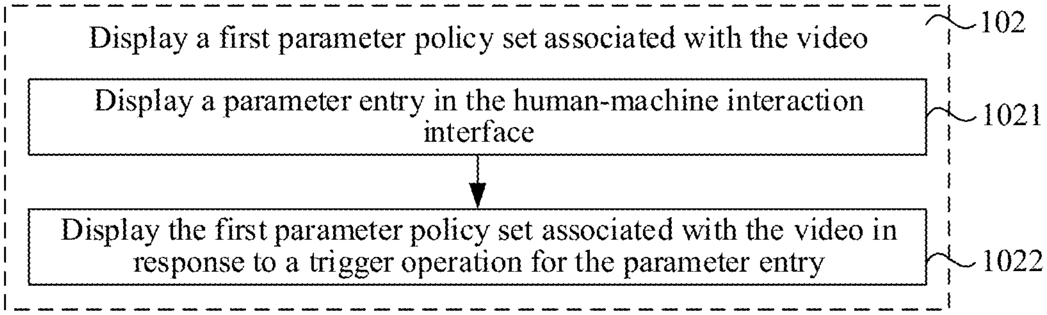

In some embodiments, the displaying a first parameter policy set associated with the video in step 102 may be implemented by step 1021 to step 1022 shown in FIG. 4B.

Step 1021. Display a parameter entry in the human-machine interaction interface.

Step 1022. Display the first parameter policy set associated with the video in response to a trigger operation for the parameter entry.

The display of the first parameter policy set is controlled by the trigger operation of the user, so that the display of the first parameter policy set meets the user's expectation, and the display efficiency of the human-machine interaction interface can be improved.

Figure 6A:
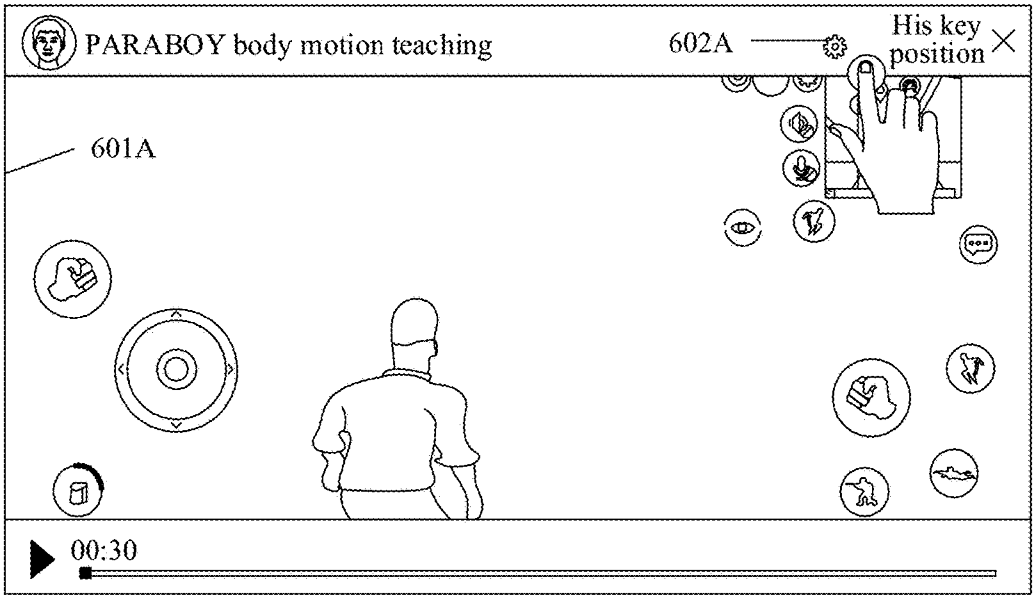
FIG. 6A to FIG. 6F are schematic interface diagrams of a parameter processing method for a virtual scene according to an embodiment of this disclosure.
Figure 6B:
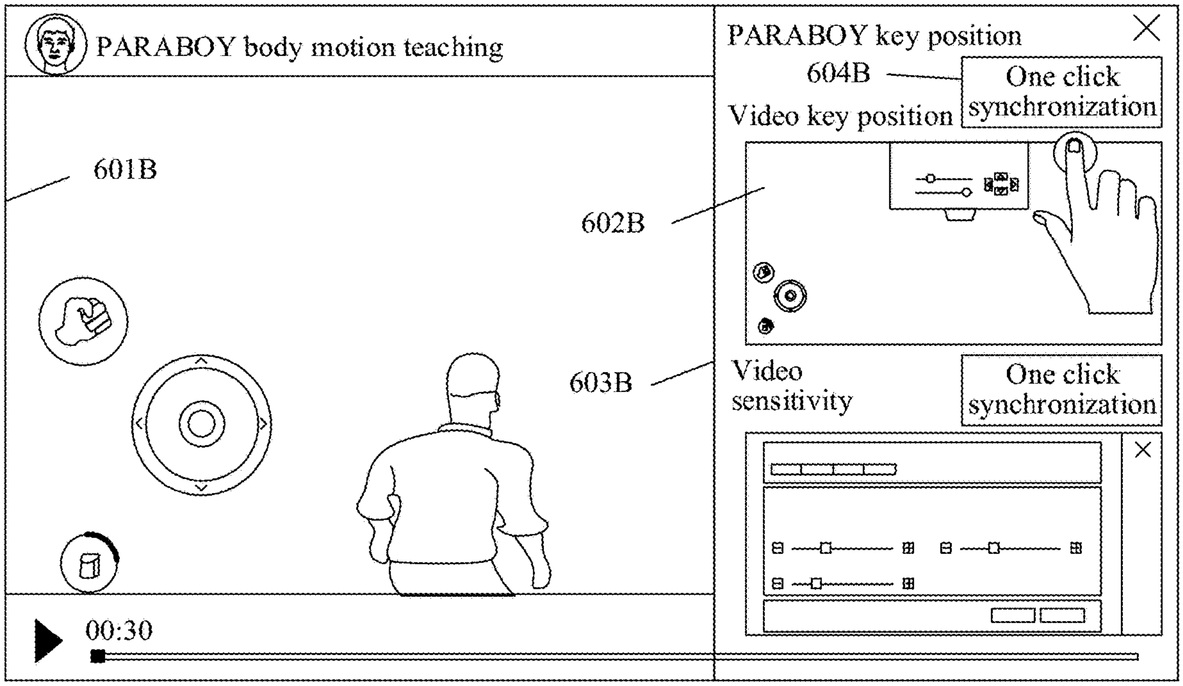

As an example, FIG. 6A is a schematic interface diagram of a parameter processing method for a virtual scene according to an embodiment of this disclosure. A video may be played in a human-machine interaction interface 601A, the video including an interaction process of a first virtual object in the virtual scene. A parameter viewing control 602A (for example, a parameter entry, which may be an entry for key positions only, an entry for sensitivity only, and an entry for both key positions and sensitivity) is displayed in the human-machine interaction interface 601A, and a first parameter policy set is displayed in response to a trigger operation of a second account for the parameter viewing control 602A. FIG. 6B is a schematic interface diagram of a parameter processing method for a virtual scene according to an embodiment of this disclosure. A parameter policy 602B bound with a video is displayed in a human-machine interaction interface 601B, and the parameter policy may be displayed in a secondary interface 603B.

In some embodiments, the displaying a first parameter policy set associated with the video in step 102 may be implemented by the following technical solutions: displaying, in response to a playing progress of the video reaching a set timestamp, a parameter policy applied by the first account in the set timestamp; and displaying, in response to a first feature parameter obtained by the first virtual object in the virtual scene being higher than a first feature parameter threshold in an interaction process related to currently played content of the video, a parameter policy applied by the first account in the interaction process related to the currently played content. The display of the first parameter policy set is intelligently controlled by the playing progress and the currently played content, which can improve the human-machine interaction efficiency.

As an example, the first feature parameter threshold may be specified by the player, or the first feature parameter threshold may be determined by the server based on historical statistical data. For example, an average value of the first feature parameters in the historical statistical data is used as the first feature parameter threshold.

As an example, the first feature parameter includes at least one of the following: a first use frequency of the parameter policy applied to the currently played content, a first interaction activity of the currently played content of the video, a first score obtained by the first virtual object in the virtual scene, a first character similarity between the first virtual object and the second virtual object controlled by the second account, and a first environment similarity between an environment in which the first virtual object is located and an environment in which the second virtual object controlled by the second account is located.

As an example, the first use frequency is the ratio of a quantity of times of applying the parameter policy to a quantity of times of applying all the parameter policies. When the first use frequency is greater than the first use frequency threshold, it indicates that the parameter policy is applied at a higher frequency and has higher reference value.

As an example, the first interaction activity is a quantity of viewers, a quantity of comments, and the like of the interaction process in the case of applying the parameter policy. When the first interaction activity is greater than the first interaction activity threshold, it indicates that the parameter policy is paid more attention and has higher reference value.

As an example, the first score is the score obtained in the interaction process or the historical average score. When the first score is greater than the first score threshold, it indicates that the parameter policy can effectively help players improve their scores.

As an example, the first character similarity includes at least one of the following: skill similarity, defense value similarity, and attack value similarity. When the first character similarity is greater than the first character similarity threshold, it indicates that the parameter policy has reference value for the second account.

As an example, the first environment similarity includes at least one of the following: a terrain similarity, a geographical position similarity, and a battle score similarity. When the first environment similarity is greater than the first environment similarity threshold, it indicates that the parameter policy has reference value for the second account.

Figure 6C:
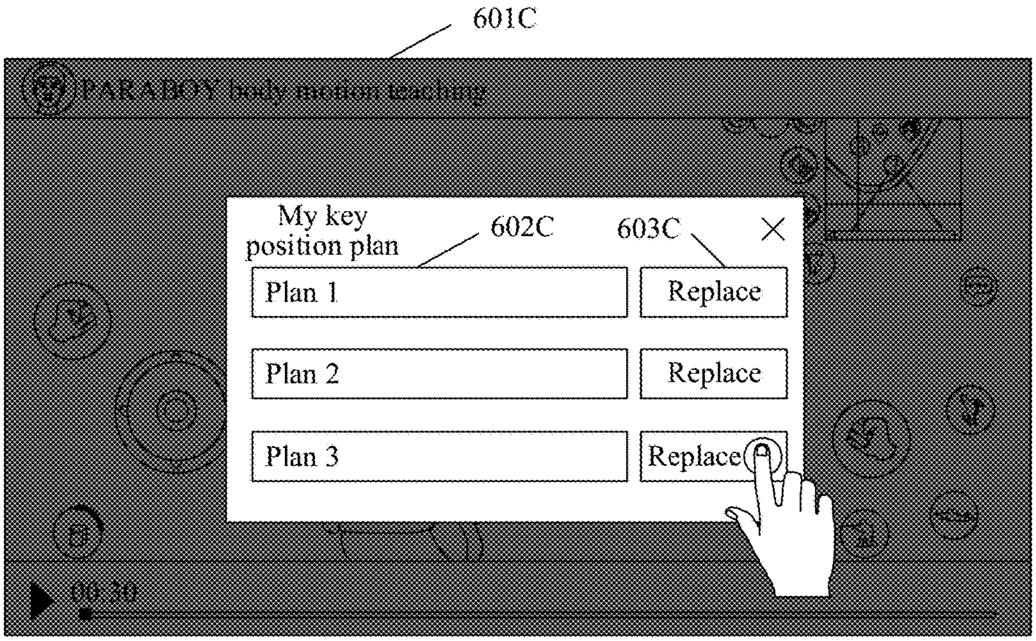
Figure 6D:
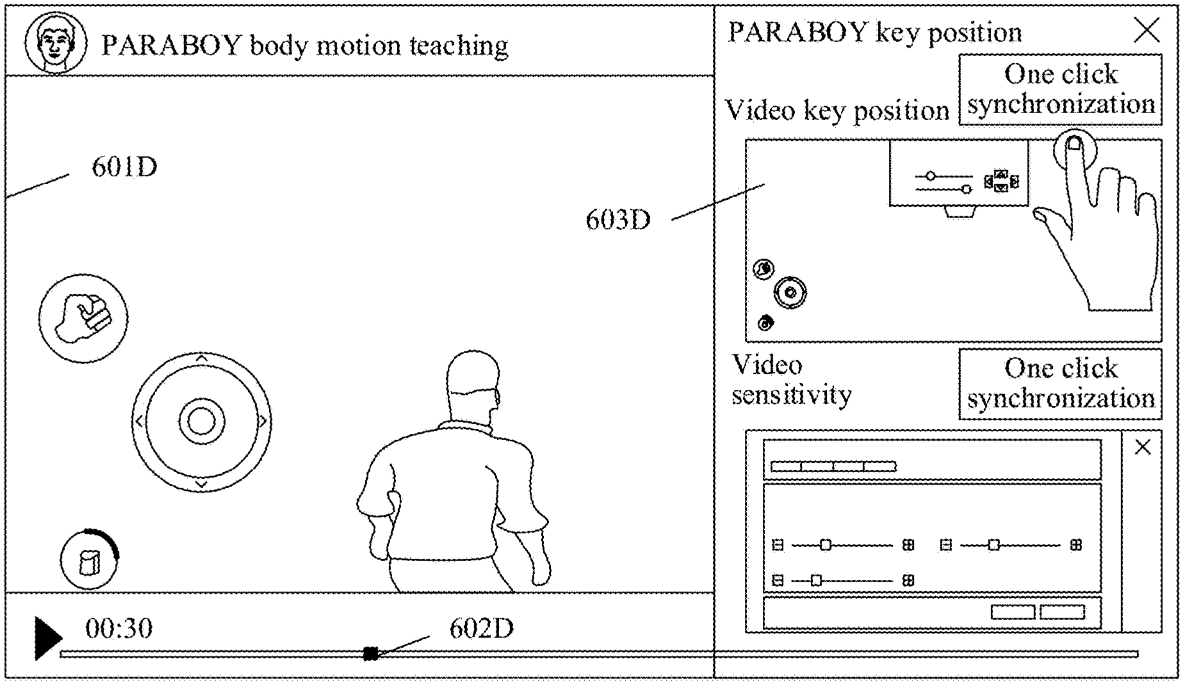
Figure 6E:
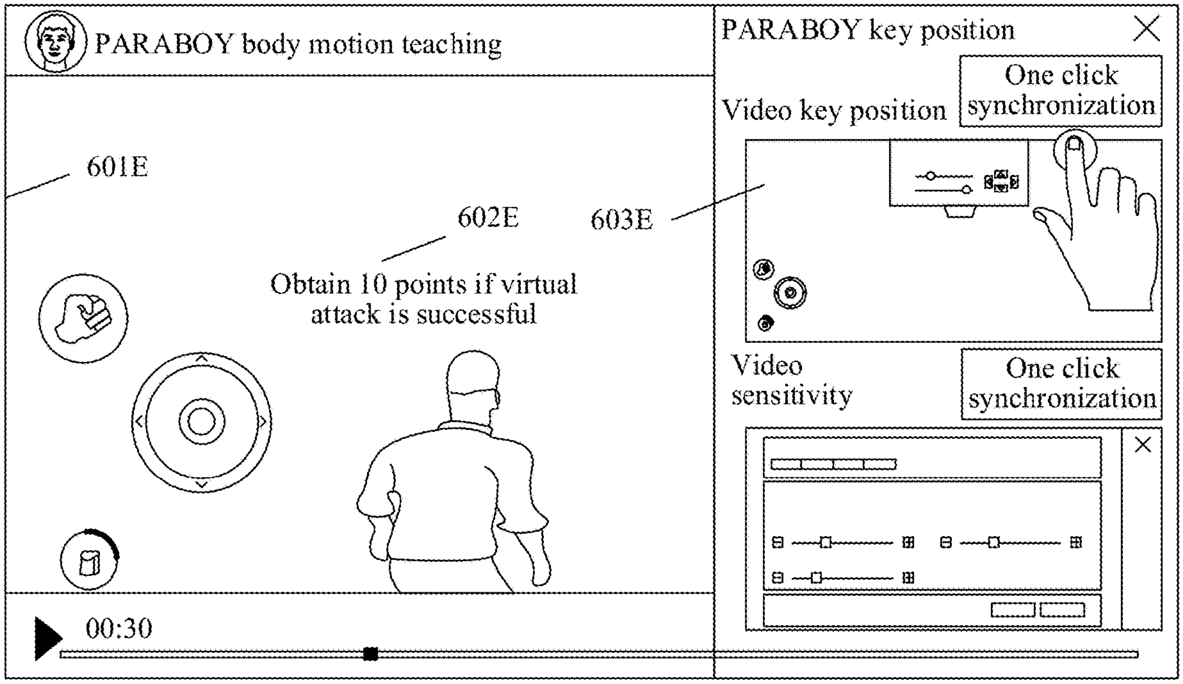

As an example, FIG. 6D is a schematic interface diagram of a parameter processing method for a virtual scene according to an embodiment of this disclosure. A video is played in a human-machine interaction interface 601D, and in response to a playing progress of the video reaching a set timestamp 602D, a parameter policy 603D applied by the first account is displayed in the set timestamp. When the video is associated with the parameter policy, at least one set timestamp of the video is associated with the parameter policy. For example, the set timestamp is the timestamp when the parameter policy applied in an interaction process changes. FIG. 6E is a schematic interface diagram of a parameter processing method for a virtual scene according to an embodiment of this disclosure. A video is played in a human-machine interaction interface 601E. Using a first feature parameter being a score as an example, when a score 602E obtained by a first virtual object in the virtual scene is higher than a score threshold in an interaction process involved in the currently played content of the video, a parameter policy 603E applied by a first account in the interaction process involved in the currently played content is displayed.

In some embodiments, the displaying a first parameter policy set associated with the video in step 102 may be implemented by the following technical solutions: displaying a parameter policy set by the first account; and displaying, in response to a second feature parameter of the first account being less than a second feature parameter of a third account, a parameter policy set by the third account. By displaying the parameter policy of the third account, the display range of the parameter policy can be effectively expanded, thereby providing more parameter policies for reference to users viewing the video, and effectively improving the human-machine interaction efficiency.

As an example, the third account is an account that controls a third virtual object to interact with the first virtual object in the virtual scene, and the interaction that occurs may be a collaborative interaction or an antagonistic interaction. Types of the third virtual object include: a virtual object in the same group as the first virtual object in the interaction process (that is, a teammate in the game) and a virtual object in a different group from the first virtual object in the interaction process (that is, an enemy in the game). During the displaying of the parameter policy set by the third account, the displaying of the parameter policy set by the first account can be stopped, or the parameter policy set by the first account can be displayed simultaneously.

Figure 6F:
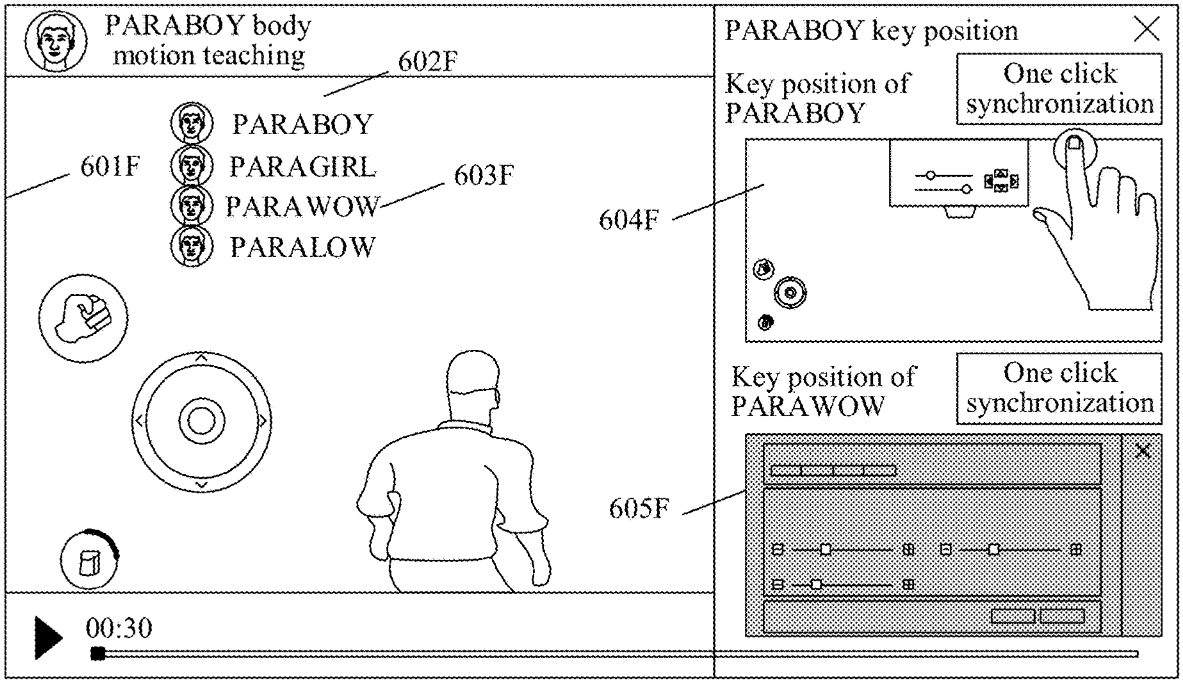

As an example, FIG. 6F is a schematic interface diagram of a parameter processing method for a virtual scene according to an embodiment of this disclosure. A parameter policy 604F set by a first account 602F is displayed in a human-machine interaction interface 601F, and a parameter policy 605F set by a third account 603F is displayed in a case that a second feature parameter of the first account is less than a second feature parameter of the third account. During the displaying of the parameter policy set by the third account, the displaying of the parameter policy set by the first account can be suspended or the parameter policy set by the first account and the third account can be displayed simultaneously, but the saliency of the display style of the parameter policy set by the first account is lower than that of the display style of the parameter policy set by the third account. The second feature parameter of the first account includes at least one of the following: the level of the first account, the score of the first account, the winning rate of the first account, the attention of the first account, and the similarity between the first account and the second account, The second feature parameter of the third account includes at least one of the following: the level of the third account, the score of the third account, the winning rate of the third account, the attention of the third account, and the similarity between the third account and the second account.

As an example, the saliency is an index used for measuring the attention of players attracted by parameter policies, and the saliency is quantified by display parameters corresponding to display styles. The display parameters include font size (the larger the font, the greater the saliency), font color (the higher the font color contrast, the greater the saliency), and the like.

As an example, the level of the first account is determined according to the game duration or the game score of the first account, and the level of the first account is positively correlated with the game duration or the game score of the first account. The score of the first account is the average score of multiple game records of the first account or the highest score in multiple game records. The winning rate of the first account is the ratio of a quantity of game victories and a total quantity of games in multiple game records of the first account. The attention of the first account is a quantity of accounts following the first account. The similarity between the first account and the second account is the feature distance between an account feature of the first account and an account feature of the second account.

As an example, the level of the third account is determined according to the game duration or the game score of the third account, and the level of the third account is positively correlated with the game duration or the game score of the third account. The score of the third account is the average score of multiple game records of the third account or the highest score in multiple game records. The winning rate of the third account is the ratio of a quantity of game victories and a total quantity of games in multiple game records of the third account. The attention of the third account is a quantity of accounts following the third account. The similarity between the third account and the second account is the feature distance between an account features of the third account and an account features of the second account.

In some embodiments, the displaying a parameter policy set by the first account may be implemented by the following technical solution: performing any one of the following processing: displaying only a parameter policy currently applied by the first account in the interaction process; displaying the parameter policy currently applied by the first account in the interaction process, and a parameter policy once applied (i.e., previously applied) by the first account in the interaction process up to the current playing progress; displaying a parameter policy applied by the first account at the end of the interaction process; and displaying the parameter policy currently applied by the first account in the interaction process, the parameter policy once applied (i.e., previously applied) by the first account in the interaction process up to the current playing progress, and a parameter policy subsequently to be applied (i.e., applied later) by the first account in the interaction process. According to the diversified display policies of the parameter policies provided in the embodiments of this disclosure, all the parameter policies can be displayed, or the parameter policies can be displayed in an accumulative manner along with the playing progress, or only the currently applied parameter policies can be displayed, thereby improving the display diversity of the parameter policies.

As an example, only the parameter policy currently applied by the first account in the interaction process is displayed. For example, only the parameter policy applied in the currently played interaction process (equivalent to the real-time parameter policy corresponding to the current playing progress) is displayed, and the parameter policy currently applied by the first account in the interaction process and the parameter policy once applied by the first account in the interaction process up to the current playing progress are displayed. For example, only the parameter policy applied in the currently played interaction process and the parameter policy once applied in the interaction process up to now are displayed, that is, along with the playing process, every time another set of parameter policies is used, the displayed content is added, and displaying another set of parameter policies is further displayed on the basis of displaying the initially applied parameter policy. For example, if a parameter policy A is initially applied, the parameter policy A is displayed, and if a parameter policy B is applied at a certain moment in the interaction process, the parameter policy A and the parameter policy B are displayed. The parameter policy applied by the first account at the end of the interaction process is displayed. For example, the first account applies multiple sets of parameter policies in the interaction process, but when the parameter policy applied by the first account at the end of the interaction process is the parameter policy A, only the parameter policy A is displayed in the human-machine interaction interface. The parameter policy currently applied by the first account in the interaction process is displayed, the parameter policy once applied by the first account in the interaction process up to the current playing progress is displayed, and the parameter policy subsequently to be applied by the first account in the interaction process is displayed. In a recording scenario, all the parameter policies associated with the video can be obtained. For example, if the parameter policy applied in the currently played interaction process is a parameter policy A, the parameter policies once applied by the first account in the interaction process up to the current playing progress are a parameter policy B and a parameter policy C, and the parameter policy subsequently to be applied by the first account in the interaction process is a parameter policy D, the parameter policy A, the parameter policy B, the parameter policy C, and the parameter policy D are displayed, which is equivalent to obtaining all the parameter policies associated with the recorded video in advance and displaying all the parameter policies.

In some embodiments, in a case that the first parameter policy set includes a plurality of sets of parameter policies, a differentiated display style is applied to the plurality of sets of parameter policies. In the embodiments of this disclosure, parameter policies with different first feature parameters are displayed in a differentiated manner, which is equivalent to prompting more recommended parameter policies to users, thereby helping users viewing the video to select appropriate parameter policies pertinently and improving the human-machine interaction efficiency.

As an example, the saliency is an index used for measuring the attention of players attracted by parameter policies, and the saliency is quantified by display parameters corresponding to display styles. The display parameters include font size (the larger the font, the greater the saliency), font color (the higher the font color contrast, the greater the saliency), and the like.

As an example, the differentiated display style meets any of the following: the saliency of the display style of parameter policy is positively correlated with the first feature parameter. The first feature parameter includes at least one of the following: a first use frequency of the parameter policy applied to the currently played content, for example, the saliency of the display style of the parameter policy is positively correlated with the first use frequency, and the display style of the parameter policy with the higher first use frequency in the plurality of sets of parameter policies is more salient; a first interaction activity of the currently played content of the video, for example, the saliency of the display style of the parameter policy is positively correlated with an amount of first interaction activity, and the display style of the parameter policy with the higher first interaction activity in the plurality of sets of parameter policies is more salient; a first score obtained by the first virtual object in the virtual scene, for example, the saliency of the display style of the parameter policy is positively correlated with the first score, and the display style of the parameter policy with the higher first score in the plurality of sets of parameter policies is more salient; a first character similarity between the first virtual object and the second virtual object controlled by the second account, for example, the saliency of the display style of the parameter policy is positively correlated with the first character similarity, and the display style of the parameter policy with the higher first character similarity in the plurality of sets of parameter policies is more salient; and a first environment similarity between an environment in which the first virtual object is located and an environment in which the second virtual object controlled by the second account is located, for example, the saliency of the display style of the parameter policy is positively correlated with the first environment similarity, and the display style of the parameter policy with the higher first environment similarity in the plurality of sets of parameter policies is more salient.

In some embodiments, during displaying of the first parameter policy set associated with the video, a selection control corresponding to each set of parameter policies in the first parameter policy set is displayed; and in response to a trigger operation for at least one selection control, a parameter policy corresponding to the triggered selection control is determined as a parameter policy for updating the second parameter policy set. By determining the parameter policy for updating the second parameter policy set through the trigger operation of the user, the parameter policy can meet the user's expectation, thereby improving the human-machine interaction efficiency.

As an example, referring to FIG. 6B, a parameter policy 602B bound with the video is displayed in a human-machine interaction interface 601B, and the parameter policy may be displayed in a secondary interface 603B. A selection control 604B of the parameter policy, such as a key position selection control or a sensitivity selection control, are further displayed in the secondary interface 603B. In response to a trigger operation for the selection control 604B, a parameter policy corresponding to the triggered selection control is determined as a parameter policy for updating the second parameter policy set, and a request can be transmitted to download the parameter policy from a cloud server.

In some embodiments, the updating a second parameter policy set corresponding to a second account based on at least one set of parameter policies in the first parameter policy set in step 103 may be implemented by the following technical solution: obtaining a parameter policy meeting a first selection condition in the first parameter policy set, and updating the second parameter policy set based on the parameter policy meeting the first selection condition. By determining the parameter policy for updating the second parameter policy set through the first selection condition, the parameter policy meeting the user's expectation can be intelligently determined, thereby improving the human-machine interaction efficiency.

As an example, the first selection condition includes at least one of the following: a first score obtained in the case of applying the parameter policy is higher than a first score threshold, where the first score is the score obtained in the interaction process or the historical average score, and the corresponding parameter policy with the first score higher than the first score threshold is determined as the parameter policy for updating the second parameter policy set; a first interaction activity obtained in the case of applying the parameter policy is higher than a first interaction activity threshold, where the first interaction activity is a quantity of viewers, a quantity of comments, and the like of the interaction process in the case of applying the parameter policy, and the corresponding parameter policy with the first interaction activity higher than the first interaction activity threshold is determined as the parameter policy for updating the second parameter policy set; a first use frequency of the parameter policy is higher than a first use frequency threshold, where the first use frequency is the ratio of a quantity of times of applying the parameter policy to a quantity of times of applying all the parameter policies, and the corresponding parameter policy with the first use frequency higher than the first use frequency threshold value is determined as the parameter policy for updating the second parameter policy set; a first character similarity between the first virtual object and the second virtual object once controlled by the second account is greater than a first character similarity threshold, where the first character similarity includes at least one of the following: skill similarity, defense value similarity, and attack value similarity; and a first environment similarity between an environment in which the first virtual object is located and an environment in which the second virtual object controlled by the second account is once located is greater than a first environment similarity threshold, where the first environment similarity includes at least one of the following: a terrain similarity, a geographical position similarity, and a battle score similarity.

Step 103. Update a second parameter policy set corresponding to a second account based on at least one set of parameter policies in the first parameter policy set in response to a parameter policy update operation. For example, a second parameter policy set corresponding to a second account is updated based on at least one of the plural parameters of the first parameter policy set in response to a parameter policy update operation. Updated parameters of the second parameter policy set include at least one of (i) position, size, or function of keys for controlling a second virtual object in the virtual scene that are the same as the position, size, or function of keys for controlling the first virtual object or (ii) sensitivity of virtual props in the virtual scene that is the same as the sensitivity of the first parameter policy set.

As an example, the parameter policy in the second parameter policy set is used for selection when the second account controls the second virtual object in the virtual scene. In step 103, the parameter policies may be updated as a whole, or the parameters may be updated piecemeal. For example, the second parameter policy set corresponding to the second account may be updated according to some parameters in the at least one set of parameter policies, and in response to a selection operation for target parameters in each parameter policy in the at least one set of parameter policies, local parameter policies in the second parameter policy set corresponding to the second account may be updated based on the selected target parameters in the each parameter policy. The local update method can improve the accuracy and precision of parameter update and improve the human-machine interaction efficiency.

In some embodiments, the updating a second parameter policy set corresponding to a second account based on at least one set of parameter policies in the first parameter policy set in step 103 may be implemented by the following technical solution: calling a first neural network model to perform the following processing for each set of parameter policies in the first parameter policy set: obtaining a multi-dimensional feature of the parameter policy, where the multi-dimensional feature includes a score feature, an interaction activity feature, and a frequency feature; extracting an account feature of the second account; fusing the multi-dimensional feature and the account feature to obtain an interest feature; mapping the interest feature into an interest level of the second account to the parameter policy; and updating the second parameter policy set based on a parameter policy whose interest level is higher than an interest level threshold. The intelligent degree and accuracy of determining the parameter policy for updating the second parameter policy set from the first parameter policy set can be improved by the neural network model.

As an example, sample multi-dimensional features, such as a sample score feature, a sample attention feature, and a sample frequency feature, of each sample parameter policy are acquired in the sample interaction process, a sample account feature of a sample account participating in the sample interaction process is obtained, and a training sample is constructed according to the acquired sample multi-dimensional feature and sample account feature, the training sample is used as input of a first neural network model to be trained, and the interest level of the sample account to the sample parameter policy is used as annotation data, to train the first neural network model. The difference between the annotation data and the predicted interest level is used as a loss function in the training process, the predicted interest level is the interest level of the predicted sample account to the sample parameter policy, and the first neural network model obtained when the loss function converges is used as the called first neural network model.

In some embodiments, the updating a second parameter policy set corresponding to the second account based on at least one set of parameter policies in the first parameter policy set in step 103 may be implemented by the following technical solutions: replacing the second parameter policy set with the at least one set of parameter policies in a case that a sum of a quantity of the at least one set of parameter policies and a quantity of parameter policies in the second parameter policy set is greater than a policy quantity threshold; and adding the at least one set of parameter policies to the second parameter policy set in a case that the sum of the quantity of the at least one set of parameter policies and the quantity of the parameter policies in the second parameter policy set is not greater than the policy quantity threshold. Determining whether the update operation is replacement or addition according to the policy quantity threshold can retain the parameter policies in the second parameter policy set to the greatest extent, so that users have more selection objects in the subsequent game process, thereby improving the human-machine interaction efficiency of users.

As an example, the parameter policies in the second parameter policy set can be stored locally in the client or downloaded from the server directly through the second account, provided that the parameter policies are associated with the second account.

As an example, in a case that the sum of the quantity of the at least one set of parameter policies and the quantity of the parameter policies in the second parameter policy set is greater than the policy quantity threshold, for example, if the user wants to obtain the parameter policy A in the first parameter policy set, that is, the quantity of parameter policies is 1, the quantity of the parameter policies in the second parameter policy set is 3, and the policy quantity threshold is 3, a parameter policy in the second parameter policy set needs to be replaced with the parameter policy A. In a case that the sum of the quantity of the at least one set of parameter policies and the quantity of the parameter policies in the second parameter policy set is not greater than the policy quantity threshold, for example, if the quantity of the at least one set of parameter policies is 1, the quantity of the parameter policies in the second parameter policy set is 2, and the policy quantity threshold is 3, the parameter policy A is added to the second parameter policy set.

In some embodiments, in a case that there are a plurality of parameter policies in the second parameter policy set, the replacing the second parameter policy set with the at least one set of parameter policies may be implemented by the following technical solutions: obtaining a difference between the sum and the policy quantity threshold; obtaining a third feature parameter of each set of parameter policies in the second parameter policy set; sorting a plurality of sets of the parameter policies in the second parameter policy set in ascending order based on the third feature parameter; and performing replacement by using the parameter policy sorted front in an ascending sort result and conforming to the difference. By intelligently determining the replaced parameter policy through the third feature parameter, the human-machine interaction efficiency can be improved.

As an example, the third feature parameter includes any one of the following: a second score obtained in the case of applying the parameter policy in the second parameter policy set, a second use frequency of the parameter policy in the second parameter policy set, and a set time of the parameter policy in the second parameter policy set. The second score is the score obtained in the interaction process of the parameter policies in the second parameter policy set or the historical average score, and the second use frequency is the ratio of a quantity of times of applying a parameter policy in the second parameter policy set to a quantity of times of applying all parameter policies.

As an example, when the parameter policy in the first parameter policy set is directly added to the second parameter policy set, there is no need to delete the existing parameter policies in the second parameter policy set, parameter policies to be deleted from the second parameter policy set need to be determined during the replacement, and the quantity of the parameter policies to be deleted from the second parameter policy set is the difference between the sum and the policy quantity threshold. For example, if the user wants to obtain the parameter policy A in the first parameter policy set, that is, the quantity of parameter policies is 1, the quantity of the parameter policies in the second parameter policy set is 3, and the policy quantity threshold is 3, one parameter policy in the second parameter policy set needs to be replaced. Therefore, it is necessary to further determine which parameter policy to delete from the second parameter policy set, which can be determined by the third feature parameter. For example, when the third feature parameter is the second score, and the second score is the score obtained in the interaction process or the historical average score, the parameter policies are sorted in ascending order according to the scores obtained by applying the parameter policies, and the parameter policy B in the second parameter policy set is replaced with the parameter policy A in the first parameter policy set.

Figure 4C:
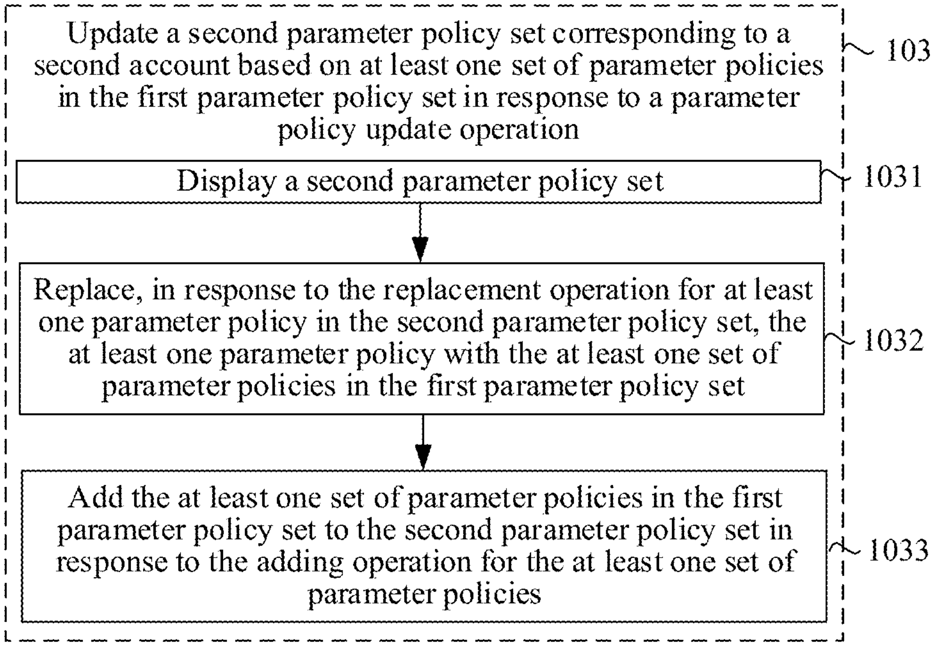

In some embodiments, the parameter policy update operation includes a replacement operation and an adding operation; and the updating a second parameter policy set corresponding to the second account based on at least one set of parameter policies in the first parameter policy set in response to the parameter policy update operation in step 103 may be implemented by step 1031 to step 1033 shown in FIG. 4C.

Step 1031. Display a second parameter policy set.

The second parameter policy set includes a parameter policy set by the second account, and the parameter policy includes a plurality of parameters for controlling the second virtual object in the human-machine interaction interface of the second account.

Step 1032. Replace, in response to the replacement operation for at least one parameter policy in the second parameter policy set, the at least one parameter policy with the at least one set of parameter policies in the first parameter policy set.

Step 1033. Add the at least one set of parameter policies in the first parameter policy set to the second parameter policy set in response to the adding operation for the at least one set of parameter policies.

Through the replacement operation and the adding operation of the user, the update process can meet the user's expectation, thereby improving the human-machine interaction efficiency.

As an example, FIG. 6C is a schematic interface diagram of a parameter processing method for a virtual scene according to an embodiment of this disclosure. A second parameter policy set is displayed, where the second parameter policy set includes a parameter policy set by the second account, and the parameter policy in the second parameter policy set includes a plurality of parameters for controlling the second virtual object in the human-machine interaction interface of the second account. A parameter policy 602C, a replacement control 603C, and an adding control 604C bound with the second account can be displayed in a human-machine interaction interface 601C. In response to the replacement operation for at least one parameter policy in the second parameter policy set, the at least one parameter policy is replaced with the at least one set of parameter policies in the first parameter policy set. In response to the trigger operation for the replacement control 603C, the parameter policy corresponding to the replacement control 603C is replaced with the parameter policy bound with the video. In response to the adding operation for the at least one set of parameter policies, and in response to the trigger operation for the adding control 604C, the parameter policy A is added to the second parameter policy set. After the update is completed, in response to the trigger operation for an application control 605C, the replaced or added parameter policy can be applied in the subsequent game battle. If the quantity of the added parameter policies and the replaced parameter policies is 1, the parameter policy can be downloaded directly by default and applied in the subsequent game process.

In some embodiments, a video is played in a human-machine interaction interface, the video including an interaction process in which a first account controls a first virtual object in a virtual scene; and a first parameter policy set associated with the video is displayed, the first parameter policy set including at least a parameter policy set by the first account, and the parameter policy including a plurality of parameters for controlling the first virtual object.

In some embodiments, after the first parameter policy set associated with the video is displayed, a second parameter policy set corresponding to the second account may also be updated based on at least one set of parameter policies in the first parameter policy set in response to a parameter policy update operation, parameter policies in the second parameter policy set being used for selection by the second account during controlling a second virtual object in the virtual scene, and the update method including replacing at least one set of local parameter policies in the second parameter policy set based on the at least one set of parameter policies, or adding the at least one set of parameter policies to the second parameter policy set.

By playing the video including the interaction process in which the first account controls the first virtual object in the virtual scene in the human-machine interaction interface, the control skill of the first account can be shared with the second account, and the first parameter policy set associated with the video can be displayed during playing of the video, which is convenient for the second account to learn the parameter setting mode of the first account. By associating the parameter policy with the video, the role that the parameter policy can play in the interaction process can be effectively reflected.

For specific implementation of the above embodiments, reference may be made to the description of the embodiments and the illustration of the example related to step 101 to step 103.

In some embodiments, a video is played in a human-machine interaction interface, the video including an interaction process in which a first account controls a first virtual object in the virtual scene, the video being associated with a first parameter policy set, the first parameter policy set including at least a parameter policy set by the first account, and the parameter policy including a plurality of parameters for controlling the first virtual object; and a second parameter policy set corresponding to a second account is updated based on at least one set of parameter policies in the first parameter policy set in response to a parameter policy update operation, parameter policies in the second parameter policy set being used for selection by the second account during controlling a second virtual object in the virtual scene, and the update method including replacing at least one set of local parameter policies in the second parameter policy set based on the at least one set of parameter policies, or adding the at least one set of parameter policies to the second parameter policy set.

In some embodiments, the first parameter policy set associated with the video may also be displayed before the second parameter policy set corresponding to the second account is updated based on at least one set of parameter policies in the first parameter policy set in response to the parameter policy update operation, the first parameter policy set including at least a parameter policy set by the first account, and the parameter policy including a plurality of parameters for controlling the first virtual object.

By playing the video including the interaction process in which the first account controls the first virtual object in the virtual scene in the human-machine interaction interface, the control skill of the first account can be shared with the second account. The second parameter policy set corresponding to the second account is updated based on at least one set of parameter policies in the first parameter policy set in response to the parameter policy update operation, and the parameter policy update operation can help the second account directly obtain the parameter policy of the first account, thereby improving the parameter configuration efficiency.

For specific implementation of the above embodiments, reference may be made to the description of the embodiments and the illustration of the example related to step 101 to step 103.

Figure 4D:
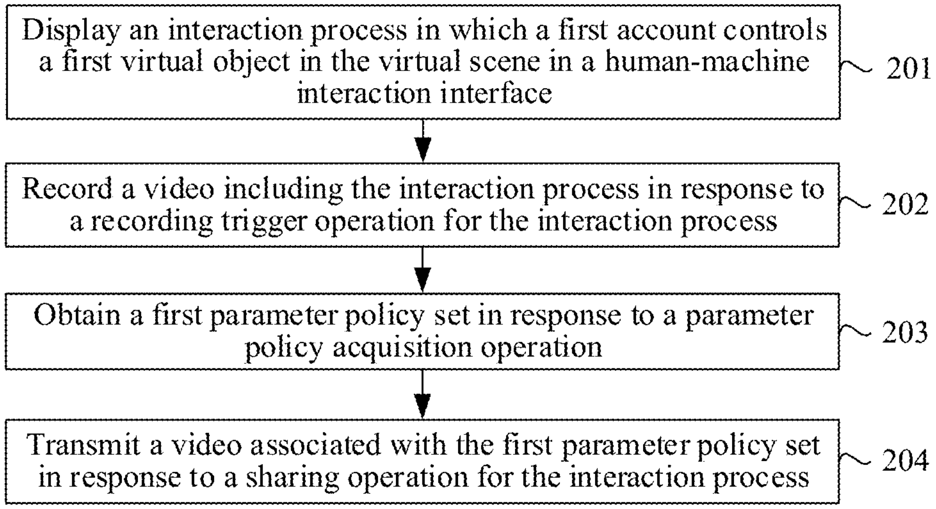

FIG. 4D is a schematic flowchart of a parameter processing method for a virtual scene according to an embodiment of this disclosure. Descriptions are provided in combination with step 201 to step 204 shown in FIG. 4D.

Step 201. Display an interaction process in which a first account controls a first virtual object in the virtual scene in a human-machine interaction interface.

Figure 5A:
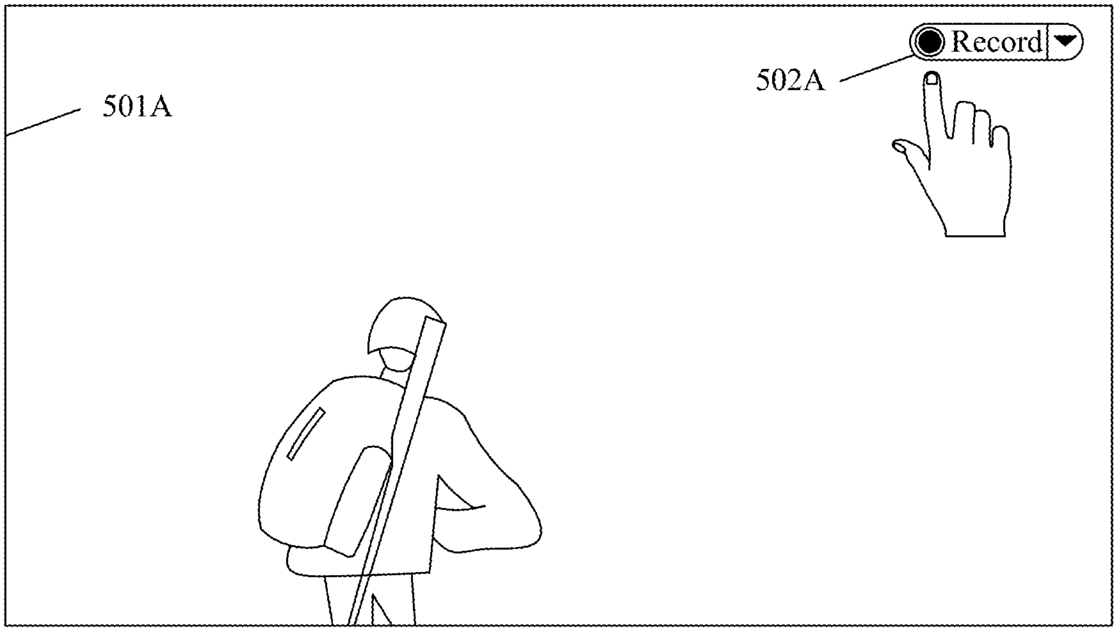
FIG. 5A to FIG. 5D are schematic interface diagrams of a parameter processing method for a virtual scene according to an embodiment of this disclosure.

As an example, FIG. 5A is a schematic interface diagram of a parameter processing method for a virtual scene according to an embodiment of this disclosure. In response to a login operation of a first account of player A, the interface enters a game battle and displays an interaction process of a first virtual object in the virtual scene.

Step 202. Record a video including the interaction process in response to a recording trigger operation for the interaction process.

As an example, a recording control 502A is displayed in a human-machine interaction interface 501A, and a screen recording function of the interaction process (game battle) is activated in response to a trigger operation for the recording control 502A, to perform screen recording on the interaction process.

Step 203. Obtain a first parameter policy set in response to a parameter policy acquisition operation.

As an example, the first parameter policy set includes at least a parameter policy set by the first account in the interaction process, and the parameter policy includes a plurality of parameters for the first account to control the first virtual object in the human-machine interaction interface.

In some embodiments, the obtaining a first parameter policy set in step 203 may be implemented by the following technical solutions: displaying a plurality of candidate parameter policies, where types of the candidate parameter policies include: a parameter policy set by the first account and applied to the interaction process; a historical parameter policy set by the first account and applied to a historical interaction process; and parameter policies set by other accounts and applied to the interaction process, where the other accounts are accounts corresponding to other virtual objects except the first virtual object in the interaction process; and forming, in response to a selection operation for the plurality of candidate parameter policies, the first parameter policy set based on the selected at least one candidate parameter policy; or forming the first parameter policy set based on candidate parameter policies meeting a second selection condition among the plurality of candidate parameter policies.

As an example, the candidate parameter policy may be from the first account or other accounts, the first account is an account for uploading the video, and the other accounts are accounts for controlling other virtual objects in the interaction process. The candidate parameter policy from the first account may be a parameter policy applied in the interaction process of the video, or may be a parameter policy once applied in the historical interaction process. That is, the candidate parameter policy has a relatively wide range, and may be constrained based on the selection operation or the second selection condition of the first account, and the parameter policy forming the first parameter policy set, that is, the parameter policy for binding with the video, may be selected from the candidate parameter policies.

In some embodiments, the second selection condition includes at least one of the following: a third score obtained in the case of applying the parameter policy is higher than a second score threshold, where the third score is the score obtained in the interaction process or the historical average score; a second interaction activity obtained in the case of applying the parameter policy is higher than a second interaction activity threshold, where the second interaction activity is a quantity of viewers, a quantity of comments, or the like in the interaction process in the case of applying the parameter policy; a third use frequency of the parameter policy is higher than a second use frequency threshold; a second character similarity between the first virtual object and a second virtual object controlled by a second account is greater than a second character similarity threshold; and a second environment similarity between an environment in which the first virtual object is located and an environment in which the second virtual object controlled by the second account is located is greater than a second environment similarity threshold. The parameter policies that need to be associated can accurately screened out through the second selection condition, thereby improving the human-machine interaction efficiency.

As an example, if there is a candidate parameter policy A and a candidate parameter policy B, the third score of the candidate parameter policy A is 100 points, but the third score of the candidate parameter policy B is 50 points, and the second score threshold is 70 points, the candidate parameter policy A is put into the first parameter policy set. If the second interaction activity of the candidate parameter policy A is 100 people viewing, but the second interaction activity of the candidate parameter policy B is 50 people viewing, and the second interaction activity threshold is 70 people viewing, the candidate parameter policy A is put into the first parameter policy set. If the third use frequency of the candidate parameter policy A is 0.8, but the third use frequency of the candidate parameter policy B is 0.1, and the second use frequency threshold is 0.5, the candidate parameter policy A is put into the first parameter policy set. If the second character similarity of the candidate parameter policy A is 0.8, but the second character similarity of the candidate parameter policy B is 0.1, and the second character similarity threshold is 0.5, the candidate parameter policy A is put into the first parameter policy set. If the second environment similarity of the candidate parameter policy A is 0.8, but the second environment similarity of the candidate parameter policy B is 0.1, and the second environment similarity threshold is 0.5, the candidate parameter policy A is put into the first parameter policy set.

Step 204. Transmit a video associated with the first parameter policy set in response to a sharing operation for the interaction process.

As an example, during transmission of the video associated with the first parameter policy set, the video can be transmitted in real time after being obtained, that is, the video is applied to a game livestreaming scenario. In the process in which the first account controls the first virtual object to interact in the virtual scene, the acquired video is bound with the first parameter policy set, and the binding result is transmitted to the server in real time. During transmission of the video associated with the first parameter policy set, the video can be transmitted after the interaction process ends, that is, the video can be applied to a game recording scenario. In the process in which the first account controls the first virtual object to interact in the virtual scene, only the video is acquired. After the interaction process ends, the acquired video is bound with the first parameter policy set, and the binding result is transmitted to the server in real time.

In some embodiments, before the video associated with the first parameter policy set is transmitted, a visible range of each set of parameter policies in the first parameter policy set is obtained in response to an authority setting operation of the first account; and some parameter policies visible for the second account in the first parameter policy set are determined based on the visible range of each set of parameter policies. Through the authority setting, the parameter policy can be enabled pertinently, thereby effectively protecting the privacy of teachers.

As an example, the authority setting operation is for each parameter policy in the first parameter policy set, and the parameter policy A and the parameter policy B are used as examples for description. The visible ranges of the parameter policy A and the parameter policy B can be obtained based on the authority setting operation. For example, if the visible range of the parameter policy A is an account A and an account B, and the visible range of the parameter policy B is the account A, based on the visible ranges of the parameter policy A and the parameter policy B, when the second account is the account B, some parameter policies visible for the second account in the first parameter policy set are the parameter policy A.

An exemplary application of the parameter processing method for a virtual scene provided in the embodiments of this disclosure in an application scenario is described below.

In some embodiments, the first account logs in to a first client (for example, an online game application) run by the terminal. The first client performs game interaction with other users by connecting to a game server (that is, the server). The first client controls a virtual object to interact with other virtual objects or virtual props in the virtual scene in response to a user operation of the first account. The first client transmits operation data to the server through a network. The server calculates display data of the operation based on the information, and transmits the display data to the first client. The first client completes the loading, analysis, and rendering of the calculated display data depending on the graphics computing hardware, and outputs the virtual scene depending on the graphics output hardware to form visual perception, that is, displays an interaction process of the virtual object in the virtual scene. The first client further transmits a video including the interaction process and a parameter policy applied in the interaction process to the server through the network. The server transmits the video including the interaction process and the parameter policy applied in the interaction process to a second client. The video and the parameter policy associated with the video are played in a human-machine interaction interface of the second client. The parameter policy includes a plurality of parameters for controlling a first virtual object in a human-machine interaction interface of the first client. The second client receives a parameter policy update operation of the second account, the second client transmits a parameter policy update request to the server, and the server transmits the parameter policy to the second client, so that the second client updates a second parameter policy set corresponding to the second account based on the parameter policy.

Figure 5B:
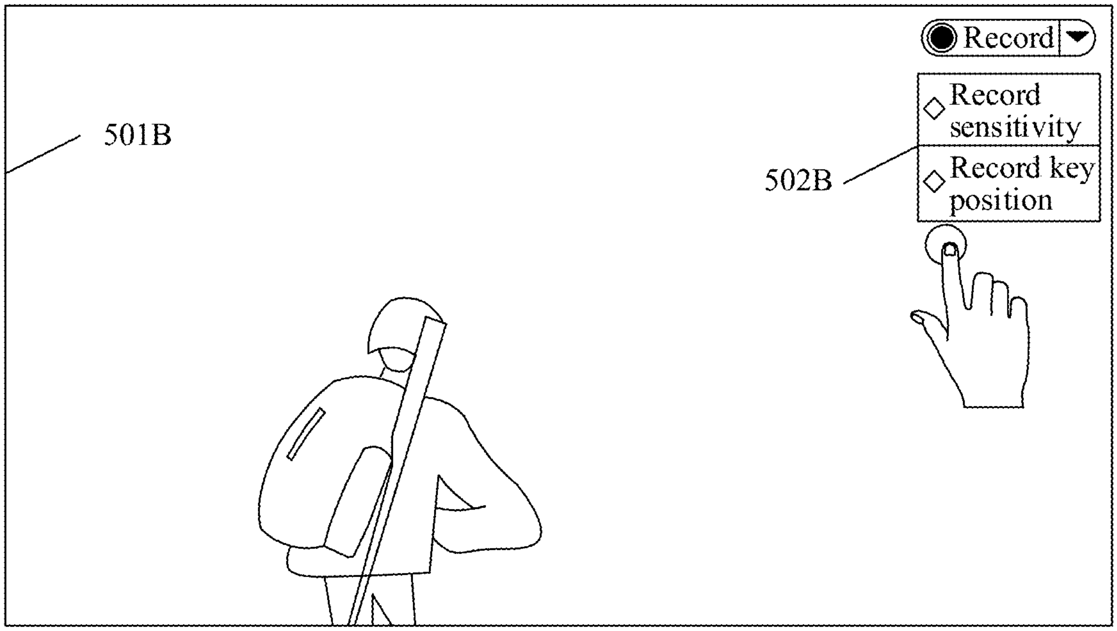
Figure 5C:
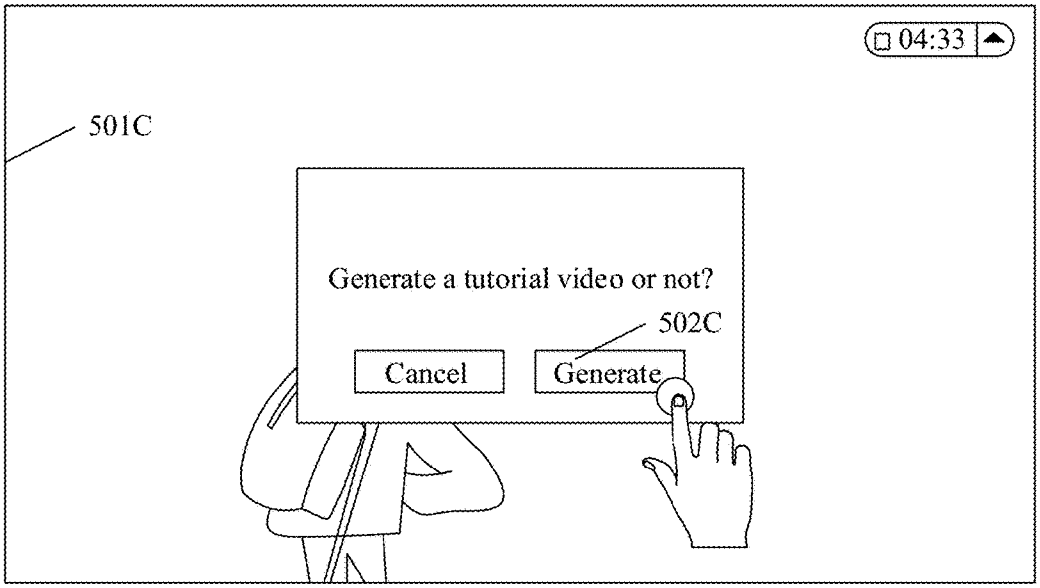
Figure 5D:
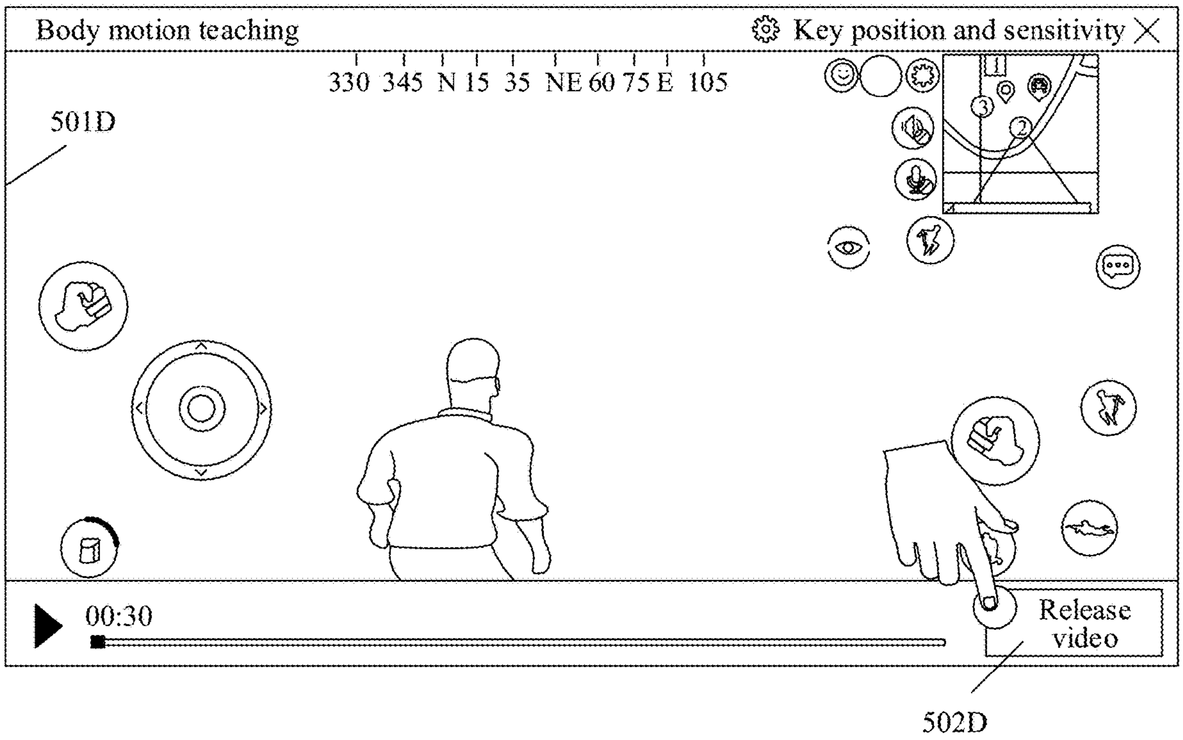

In some embodiments, the interaction process for player A to upload a tutorial video bound with a key position is as follows: Referring to FIG. 5A, in response to a login operation of a first account of player A, the interface enters a game battle and displays an interaction process of a first virtual object in the virtual scene. A recording control 502A is displayed in a human-machine interaction interface 501A, and a screen recording function of the interaction process (game battle) is activated in response to a trigger operation for the recording control 502A, to perform screen recording on the interaction process. FIG. 5B is a schematic interface diagram of a parameter processing method for a virtual scene according to an embodiment of this disclosure. A human-machine interaction interface 501B displays a parameter control 502B, and the parameter control 502B includes "recording sensitivity" and "recording key position". After the screen recording of the game battle ends, a parameter policy applied to the game battle process is obtained in response to the trigger operation for the parameter control 502B. The parameter policy includes at least one of the following: sensitivity parameters and key position parameters. In addition to the above manner, the trigger operation for the parameter control 502B can be initiated and responded to at any time. FIG. 5C is a schematic interface diagram of a parameter processing method for a virtual scene according to an embodiment of this disclosure. After the screen recording of the game battle ends, a video generation control 502C is displayed in the human-machine interaction interface 501C. A video bound with the parameter policy can be generated in response to a trigger operation for a video generation control 502C, and the video bound with the parameter policy can be uploaded to the cloud for automatic storage. The competition system can be entered to view the generated and uploaded video. FIG. 5D is a schematic interface diagram of a parameter processing method for a virtual scene according to an embodiment of this disclosure. After the competition system is entered, a release control 502D is displayed in a human-machine interaction interface 501D. In response to a trigger operation for the release control 502D, the video is operated and audited to ensure that there is no sensitive information in the video, so that the video can be displayed in the competition system for other players B to view.

In some embodiments, during the viewing of the tutorial video by player B, the interaction manner for synchronizing parameter policies associated in the video is as follows: Referring to FIG. 6A, a video may be played in a human-machine interaction interface 601A, the video including an interaction process of a first virtual object in a virtual scene. A parameter viewing control 602A is displayed in the human-machine interaction interface 601A. When player B views the video in the competition system, a parameter policy bound with the video is viewed in response to a trigger operation of player B for the parameter view control 602A. The parameter policy includes key position setting and sensitivity setting applied to the interaction process in the video.

In some embodiments, referring to FIG. 6B, a parameter policy 602B bound with the video is displayed in a human-machine interaction interface 601B, and the parameter policy may be displayed in a secondary interface 603B. A selection control 604B of the parameter policy, such as a key position selection control or a sensitivity selection control, are further displayed in the secondary interface 603B. In response to a trigger operation for the selection control 604B, a request can be transmitted to download a parameter policy corresponding to a video identifier from the cloud server, and the parameter policy transmitted by the cloud server is received and then cached to the local client or corresponding local server of player B. Parameter policies already bound with the account of player B are further displayed for player B to select which set of parameter policies to replace with the parameter policy in the video.

In some embodiments, referring to FIG. 6C, a local parameter policy 602C and a replacement control 603C bound with the account of player B are displayed in the human-machine interaction interface 601C, and the parameter policy corresponding to the replacement control 603C is replaced with the parameter policy bound with the video in response to a trigger operation for the replacement control 603C. After the replacement is completed, in response to a trigger operation for an application control, the parameter policy obtained by replacement can be applied in the subsequent game battle, and the parameter policy already bound with the account of player B can be replaced with the parameter policy downloaded from the cloud server.

Figure 7:
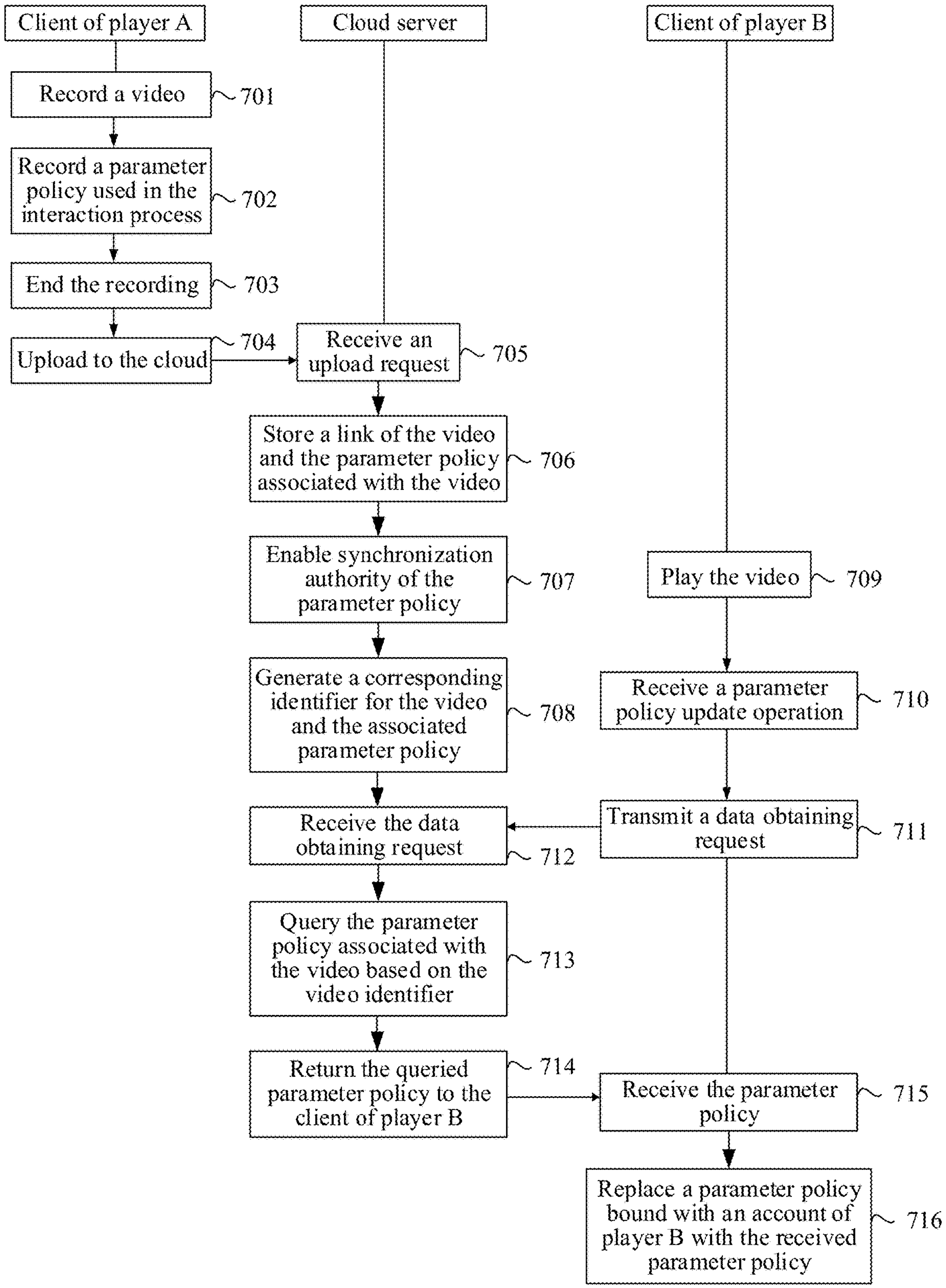
FIG. 7 is an interaction flowchart of a parameter processing method for a virtual scene according to an embodiment of this disclosure.

In some embodiments, FIG. 7 is an interaction flowchart of a parameter processing method for a virtual scene according to an embodiment of this disclosure. The technical solutions of the client for uploading the tutorial video bound with the key position by player A are as follows: Step 701. Record a video. A video of an interaction process is recorded in response to a recording operation of player A in a client. Step 702. Record a parameter policy used in the interaction process. In the recording process, the option of recording the parameter policy is automatically checked in the recording process, that is, the parameter recording function is automatically enabled by local default. In the recording process, the recording of parameters can also be cancelled. In response to checking the option of canceling recording, data marks for marked parameters are cancelled. Only the marked parameters are recorded in the client, and the parameters in which the data marks are cancelled are not recorded. The local client caches the latest applied parameter policy in the interaction process in real time until the recording ends. When a parameter is modified in the recording process, the parameter policy formed after the modification overwrites the parameter policy before the modification. Step 703. End the recording. The client or the local server stores the video and the latest marked parameter. Step 704. Upload the video to the cloud server. The local server bundles the recorded video with the parameter policy and uploads the video to the cloud server.

In some embodiments, the technical solutions implemented by the cloud server are as follows: Step 705. Receive an upload request. Step 706. The cloud server stores a link of the video and the parameter policy associated with the video. Step 707. The cloud server enables synchronization authority of the parameter policy. Step 708. Generate a corresponding identifier for the video and the associated parameter policy.

In some embodiments, during the viewing of the tutorial video by player B, the technical solutions for synchronizing the parameter policy associated with the video are as follows: Step 709. Play the video. Step 710. Receive a parameter policy update operation. Step 711. Transmit a data obtaining request to the cloud server. Step 712. Receive the data obtaining request from the client of player B. Step 713. Query the parameter policy associated with the video based on the video identifier. Step 714. The cloud server returns the queried parameter policy to the client of player B. Step 715. The client of player B or the corresponding local server receives the parameter policy. Step 716. Replace a parameter policy bound with an account of player B with the received parameter policy.

In the parameter processing method for a virtual scene provided in the embodiments of this disclosure, the parameter policy applied in the tutorial video can be directly bound with the video, and the player viewing the video can be provided with the function of synchronizing the parameter policy with one key, to effectively improve the efficiency of observing and learning of the player. Compared with the manner of adjusting one by one in the setting interface, the parameter configuration efficiency is effectively improved, and the video is bound with the parameter policy, so that the effect of the parameter policy can be effectively displayed through the video.

It can be understood that in the embodiments of this disclosure, related data such as user information are involved. When the embodiments of this disclosure are applied to specific products or technologies, user permission or consent is required, and the acquisition, application, and processing of the related data need to comply with relevant laws, regulations and standards of relevant countries and regions.

The following continues to describe an exemplary structure in which the parameter processing apparatus 455-1 for a virtual scene provided in the embodiments of this disclosure is implemented as software modules. In some embodiments, as shown in FIG. 3, the software modules in the parameter processing apparatus 455-1 for a virtual scene stored in the memory 450 may include: a playing module 4551, configured to play a video in a human-machine interaction interface, the video including an interaction process in which a first account controls a first virtual object in the virtual scene; a first display module 4552, configured to display a first parameter policy set associated with the video, the first parameter policy set including at least a parameter policy set by the first account, and the parameter policy including a plurality of parameters for controlling the first virtual object in the human-machine interaction interface of the first account; and an update module 4553, configured to update a second parameter policy set corresponding to a second account based on at least one set of parameter policies in the first parameter policy set in response to a parameter policy update operation, parameter policies in the second parameter policy set being used for selection by the second account during controlling a second virtual object in the virtual scene.

In some embodiments, the first display module 4552 is further configured to: display a parameter entry in the human-machine interaction interface; and A video-associated first parameter policy set is displayed in response to a trigger operation for the parameter entry.

In some embodiments, the first display module 4552 is further configured to: display, in response to a playing progress of the video reaching a set timestamp, a parameter policy applied by the first account in the set timestamp; and display, in response to a first feature parameter obtained by the first virtual object in the virtual scene being higher than a first feature parameter threshold in an interaction process related to currently played content of the video, a parameter policy applied by the first account in the interaction process related to the currently played content, where the first feature parameter includes at least one of the following: a first use frequency of the parameter policy applied to the currently played content; a first interaction activity of the currently played content of the video; a first score obtained by the first virtual object in the virtual scene; a first character similarity between the first virtual object and the second virtual object controlled by the second account; and a first environment similarity between an environment in which the first virtual object is located and an environment in which the second virtual object controlled by the second account is located.

In some embodiments, the first display module 4552 is further configured to: display a parameter policy set by the first account; and display, in response to a second feature parameter of the first account being less than a second feature parameter of a third account, a parameter policy set by the third account, where the third account is an account that controls a third virtual object to interact with the first virtual object in the virtual scene, and types of the third virtual object include: a virtual object in the same group as the first virtual object in the interaction process, and a virtual object in a different group from the first virtual object in the interaction process.

In some embodiments, the first display module 4552 is further configured to: perform any one of the following processing: displaying only a parameter policy currently applied by the first account in the interaction process; displaying the parameter policy currently applied by the first account in the interaction process, and a parameter policy once applied by the first account in the interaction process up to the current playing progress; displaying a parameter policy applied by the first account at the end of the interaction process; and displaying the parameter policy currently applied by the first account in the interaction process, the parameter policy once applied by the first account in the interaction process up to the current playing progress, and a parameter policy subsequently to be applied by the first account in the interaction process.

In some embodiments, in a case that the first parameter policy set includes a plurality of sets of parameter policies, the first display module 4552 is further configured to: apply a differentiated display style to the plurality of sets of parameter policies, where the differentiated display style conforms to any one of the following: a saliency degree of the display style of the parameter policy is positively correlated with a first feature parameter obtained by the first virtual object in the virtual scene; and the first feature parameter includes at least one of the following: a first use frequency of a parameter policy applied to the currently played content; a first interaction activity of the currently played content of the video; a first score obtained by the first virtual object in the virtual scene; a first character similarity between the first virtual object and the second virtual object controlled by the second account; and a first environment similarity between an environment in which the first virtual object is located and an environment in which the second virtual object controlled by the second account is located.

In some embodiments, when displaying a first parameter policy set associated with the video, the first display module 4552 is further configured to: display a selection control corresponding to each set of parameter policies in the first parameter policy set; and determine, in response to a trigger operation for at least one selection control, a parameter policy corresponding to the triggered selection control as a parameter policy for updating the second parameter policy set.

In some embodiments, the update module 4553 is further configured to: obtain a parameter policy meeting a first selection condition in the first parameter policy set, and update the second parameter policy set based on the parameter policy meeting the first selection condition, where the first selection condition includes at least one of the following: a first score obtained in the case of applying the parameter policy is higher than a first score threshold; a first interaction activity obtained in the case of applying the parameter policy is higher than a first interaction activity threshold; a first use frequency of the parameter policy is higher than a first use frequency threshold; a first character similarity between the first virtual object and the second virtual object controlled by the second account is greater than a first character similarity threshold; and a first environment similarity between an environment in which the first virtual object is located and an environment in which the second virtual object controlled by the second account is located is greater than a first environment similarity threshold.

In some embodiments, the update module 4553 is further configured to call a first neural network model to perform the following processing for each set of parameter policies in the first parameter policy set: obtaining a multi-dimensional feature of the parameter policy, where the multi-dimensional feature includes a score feature, an interaction activity feature, and a frequency feature; extracting an account feature of the second account; fusing the multi-dimensional feature and the account feature to obtain an interest feature; mapping the interest feature into an interest level of the second account to the parameter policy; and updating the second parameter policy set based on a parameter policy whose interest level is higher than an interest level threshold.

In some embodiments, the update module 4553 is further configured to: replace the second parameter policy set with the at least one set of parameter policies in a case that a sum of a quantity of the at least one set of parameter policies and a quantity of parameter policies in the second parameter policy set is greater than a policy quantity threshold; and add the at least one set of parameter policies to the second parameter policy set in a case that the sum of the quantity of the at least one set of parameter policies and the quantity of the parameter policies in the second parameter policy set is not greater than the policy quantity threshold.

In some embodiments, the update module 4553 is further configured to: obtain a difference between the sum and the policy quantity threshold; obtain a third feature parameter of each set of parameter policies in the second parameter policy set; sorting a plurality of sets of the parameter policies in the second parameter policy set in ascending order based on the third feature parameter; and performing replacement by using the parameter policy sorted front in an ascending sort result and conforming to the difference, where the third feature parameter includes any one of the following: a second score obtained in the case of applying the parameter policy in the second parameter policy set, a second use frequency of the parameter policy in the second parameter policy set, and a set time of the parameter policy in the second parameter policy set.

In some embodiments, the parameter policy update operation includes a replacement operation and an adding operation; and the update module 4553 is further configured to: display a second parameter policy set, where the second parameter policy set includes a parameter policy set by the second account, and the set parameter policy includes a plurality of parameters for controlling the second virtual object in the human-machine interaction interface of the second account; replace, in response to the replacement operation for at least one parameter policy in the second parameter policy set, the at least one parameter policy with the at least one set of parameter policies in the first parameter policy set; and add the at least one set of parameter policies in the first parameter policy set to the second parameter policy set in response to the adding operation for the at least one set of parameter policies.

The following continues to describe an exemplary structure in which the parameter processing apparatus 455-2 for a virtual scene provided in the embodiments of this disclosure is implemented as software modules. In some embodiments, as shown in FIG. 3, the software modules in the parameter processing apparatus 455-2 for a virtual scene stored in the memory 450 may include: a second display module 4554, configured to display an interaction process in which a first account controls a first virtual object in the virtual scene in a human-machine interaction interface; a recording module 4555, configured to record a video including the interaction process in response to a recording trigger operation for the interaction process; an obtaining module 4556, configured to obtain a first parameter policy set in response to a parameter policy acquisition operation, the first parameter policy set including at least a parameter policy set by the first account in the interaction process, and the parameter policy including a plurality of parameters for the first account to control the first virtual object in the human-machine interaction interface; and a sharing module 4557, configured to transmit a video associated with the first parameter policy set in response to a sharing operation for the interaction process.

In some embodiments, the obtaining module 4556 is further configured to: display a plurality of candidate parameter policies, where types of the candidate parameter policies include: a parameter policy set by the first account and applied to the interaction process; a historical parameter policy set by the first account and applied to a historical interaction process; and parameter policies set by other accounts and applied to the interaction process, where the other accounts are accounts corresponding to other virtual objects except the first virtual object in the interaction process; and form, in response to a selection operation for the plurality of candidate parameter policies, the first parameter policy set based on the selected at least one candidate parameter policy; or form the first parameter policy set based on candidate parameter policies meeting a second selection condition among the plurality of candidate parameter policies.

In some embodiments, the second selection condition includes at least one of the following: a third score obtained in the case of applying the parameter policy is higher than a second score threshold; a second interaction activity obtained in the case of applying the parameter policy is higher than a second interaction activity threshold; a third use frequency of the parameter policy is higher than a second use frequency threshold; a second character similarity between the first virtual object and a second virtual object controlled by a second account is greater than a second character similarity threshold; and a second environment similarity between an environment in which the first virtual object is located and an environment in which the second virtual object controlled by the second account is located is greater than a second environment similarity threshold.

In some embodiments, before the video associated with the first parameter policy set is transmitted, the obtaining module 4556 is further configured to: obtain a visible range of each set of parameter policies in the first parameter policy set in response to an authority setting operation of the first account, where determine some parameter policies visible for the second account in the first parameter policy set based on the visible range of each set of parameter policies.

An embodiment of this disclosure provides a computer program product or computer program including computer-executable instructions stored in a non-transitory computer-readable storage medium. A processor of an electronic device reads the computer-executable instructions from the computer-readable storage medium, and the processor executes the computer-executable instructions so that the electronic device performs the parameter processing method for a virtual scene described above in the embodiments of this disclosure.

An embodiment of this disclosure provides a computer-readable storage medium, storing computer-executable instructions, the computer-executable instructions, when executed by a processor, causing the processor to perform the parameter processing method for a virtual scene provided in the embodiments of this disclosure, for example, the parameter processing method for a virtual scene shown in FIG. 4A to FIG. 4D.

In some embodiments, the computer-readable storage medium may be memory such as FRAM, ROM, PROM, EPROM, EEPROM, flash memory, magnetic surface memory, optical disk, or CD-ROM; or may be various devices including one or any combination of the above memories.

In some embodiments, the computer-executable instructions may be written in any form of programming language (including compiling or interpreting languages, or declarative or procedural languages) in the form of programs, software, software modules, scripts, or code, and may be deployed in any form, including being deployed as standalone programs or as modules, components, subroutines, or other units suitable for application in a computing environment.

As an example, the computer-executable instructions may, but do not necessarily correspond to a file in a file system, and may be stored as part of a file holding other programs or data, for example, stored in one or more scripts in a Hyper Text Markup Language (HTML) document, stored in a single file dedicated to the discussed program, or stored in a plurality of collaborative files (for example, files storing one or more modules, subroutines, or code portions).

As an example, the computer-executable instructions may be deployed for execution on one electronic device, or on a plurality of electronic devices located at one location, or on a plurality of electronic devices distributed at a plurality of locations and interconnected by a communication network.

To sum up, in the embodiments of this disclosure, by playing the video including the interaction process in which the first account controls the first virtual object in the virtual scene in the human-machine interaction interface, the control skill of the first account can be shared with the second account, and the first parameter policy set associated with the video can be displayed during playing of the video, which is convenient for the second account to learn the parameter setting mode of the first account. By associating the parameter policy with the video, the role that the parameter policy can play in the interaction process can be effectively reflected. In response to the parameter policy update operation, the second parameter policy set corresponding to the second account is updated based on at least one set of parameter policies in the first parameter policy set, and the parameter policy update operation can help the second account directly obtain the parameter policy of the first account, thereby improving the parameter configuration efficiency.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A parameter processing method for a virtual scene, the method comprising:

playing a video in a user interaction interface of a second account, wherein the video comprises an interaction process in which a first account controls a first virtual object in the virtual scene according to a first parameter policy set that is associated with the video;

displaying, in a secondary user interface displayed with the user interaction interface during playback of the video, the first parameter policy set associated with the video and corresponding to the first account, the first parameter policy set comprising plural parameters including at least one of (i) position, size, or function of keys for controlling the first virtual object in a user interaction interface of the first account or (ii) sensitivity of virtual props in the virtual scene;

receiving a user selection to perform an update based on the first parameter policy set associated with video via a selection control element in the secondary user interface; and updating a second parameter policy set corresponding to the second account based on at least one of the plural parameters of the first parameter policy set associated with the video in response to the user selection to perform the update based on the first parameter policy set, wherein updated parameters of the second parameter policy set include at least one of (i) position, size, or function of keys for controlling a second virtual object in the virtual scene that are the same as the position, size, or function of keys for controlling the first virtual object or (ii) sensitivity of virtual props in the virtual scene that is the same as the sensitivity of the first parameter policy set.

2. The method according to claim 1, wherein the displaying the first parameter policy set comprises:

displaying a parameter entry element in the user interaction interface; and displaying the first parameter policy set associated with the video in response to a trigger operation being performed on the parameter entry element.

3. The method according to claim 1, wherein the displaying the first parameter policy set comprises:

in response to a playing progress of the video reaching a set timestamp, displaying a parameter policy of the first account in the set timestamp; and in response to a first feature parameter obtained by the first virtual object in the virtual scene being higher than a first feature parameter threshold in an interaction process related to currently played content of the video, displaying a parameter policy of the first account in the interaction process related to the currently played content, wherein the first feature parameter comprises at least one of:

a first use frequency of the parameter policy applied to the currently played content;

a first interaction activity of the currently played content of the video;

a first score obtained by the first virtual object in the virtual scene;

a first character similarity between the first virtual object and the second virtual object controlled by the second account; or a first environment similarity between an environment in which the first virtual object is located and an environment in which the second virtual object controlled by the second account is located.

4. The method according to claim 1, wherein the displaying the first parameter policy set comprises:

displaying a parameter policy set of the first account; and in response to a second feature parameter of the first account being less than a second feature parameter of a third account, displaying a parameter policy set of the third account, wherein the third account is an account that controls a third virtual object to interact with the first virtual object in the virtual scene, and types of the third virtual object comprise:

a virtual object in a same group as the first virtual object in the interaction process, and a virtual object in a different group from the first virtual object in the interaction process.

5. The method according to claim 4, wherein the displaying the parameter policy set of the first account comprises:

performing one of:

displaying only a parameter policy currently applied by the first account in the interaction process;

displaying the parameter policy currently applied by the first account in the interaction process, and a parameter policy previously applied by the first account in the interaction process;

displaying a parameter policy applied by the first account at an end of the interaction process; or displaying the parameter policy currently applied by the first account in the interaction process, the parameter policy previously applied by the first account in the interaction process, and a parameter policy to be applied later by the first account in the interaction process.

6. The method according to claim 1, wherein the first parameter policy set comprises a plurality of sets of parameter policies, the method further comprises applying a differentiated display style to the plurality of sets of parameter policies, a saliency degree of a display style of a respective parameter policy is positively correlated with a first feature parameter obtained by the first virtual object in the virtual scene, and the first feature parameter comprises at least one of:

a first use frequency of the respective parameter policy applied to currently played content of the video;

a first interaction activity of the currently played content of the video;

a first score obtained by the first virtual object in the virtual scene;

a first character similarity between the first virtual object and the second virtual object controlled by the second account; or a first environment similarity between an environment in which the first virtual object is located and an environment in which the second virtual object controlled by the second account is located.

7. The method according to claim 6, wherein, during the displaying the first parameter policy set associated with the video, the method further comprises:

displaying a selection control element corresponding to each set of parameter policies in the first parameter policy set; and determining, in response to a trigger operation being performed on one of the selection control elements, a parameter policy corresponding to the triggered selection control element as a parameter policy for updating the second parameter policy set.

8. The method according to claim 6, wherein the updating the second parameter policy set comprises:

obtaining a parameter policy meeting a first selection condition in the first parameter policy set, and updating the second parameter policy set based on the parameter policy meeting the first selection condition, wherein the first selection condition comprises at least one of:

the first score obtained when the parameter policy is applied is higher than a first score threshold;

the first interaction activity obtained when the parameter policy is applied is higher than a first interaction activity threshold;

the first use frequency of the parameter policy is higher than a first use frequency threshold;

the first character similarity between the first virtual object and the second virtual object controlled by the second account is greater than a first character similarity threshold; or the first environment similarity between the environment in which the first virtual object is located and the environment in which the second virtual object controlled by the second account is located is greater than a first environment similarity threshold.

9. The method according to claim 6, wherein the updating the second parameter policy set comprises:

executing a first neural network model to perform, for each set of parameter policies in the first parameter policy set:

obtaining a multi-dimensional feature of the respective set of parameter policies, wherein the multi-dimensional feature comprises a score feature, an interaction activity feature, and a frequency feature;

extracting an account feature of the second account;

fusing the multi-dimensional feature and the account feature to obtain an interest feature;

mapping the interest feature into an interest level of the second account to the respective set of parameter policies; and updating the second parameter policy set based on a parameter policy whose interest level is higher than an interest level threshold.

10. The method according to claim 6, wherein the updating the second parameter policy set comprises:

replacing the second parameter policy set with at least one set of parameter policies of the first parameter policy set in response to a determination that a sum of a quantity of the at least one set of parameter policies of the first parameter policy set and a quantity of parameter policies in the second parameter policy set is greater than a policy quantity threshold; and adding the at least one set of parameter policies of the first parameter policy set to the second parameter policy set in response to a determination that the sum of the quantity of the at least one set of parameter policies of the first parameter policy set and the quantity of the parameter policies in the second parameter policy set is not greater than the policy quantity threshold.

11. The method according to claim 10, wherein the second parameter policy set includes a plurality of parameter policies, and the replacing the second parameter policy set with the at least one set of parameter policies of the first parameter policy set comprises:

obtaining a difference between the sum and the policy quantity threshold;

obtaining a third feature parameter of each parameter policy in the second parameter policy set;

sorting the plurality of parameter policies in the second parameter policy set in an ascending order based on the third feature parameters; and performing the replacement by using the parameter policy sorted first in the ascending order and conforming to the difference, wherein the third feature parameter comprises one of: a second score obtained when applying a respective parameter policy in the second parameter policy set, a second use frequency of the respective parameter policy in the second parameter policy set, and a set time of the respective parameter policy in the second parameter policy set.

12. The method according to claim 1, wherein the updating the second parameter policy set comprises:

displaying the second parameter policy set, wherein the second parameter policy set comprises a plurality of parameters for controlling the second virtual object in the user interaction interface of the second account;

in response to a replacement operation being performed on at least one parameter policy in the second parameter policy set, replacing the at least one parameter policy with at least one set of parameter policies in the first parameter policy set; and adding at least one set of parameter policies in the first parameter policy set to the second parameter policy set in response to an adding operation being performed on the at least one set of parameter policies in the first parameter policy set.

13. A parameter processing apparatus for a virtual scene, comprising:

processing circuitry configured to play a video in a user interaction interface of a second account, wherein the video comprises an interaction process in which a first account controls a first virtual object in the virtual scene according to a first parameter policy set that is associated with the video;

display, in a secondary user interface displayed with the user interaction interface during playback of the video, the first parameter policy set associated with the video and corresponding to the first account, the first parameter policy set comprising plural parameters including at least one of (i) position, size, or function of keys for controlling the first virtual object in a user interaction interface of the first account or (ii) sensitivity of virtual props in the virtual scene;

receive a user selection to perform an update based on the first parameter policy set associated with video via a selection control element in the secondary user interface; and update a second parameter policy set corresponding to the second account based on at least one of the plural parameters of the first parameter policy set associated with the video in response to the user selection to perform the update based on the first parameter policy set, wherein updated parameters of the second parameter policy set include at least one of (i) position, size, or function of keys for controlling a second virtual object in the virtual scene that are the same as the position, size, or function of keys for controlling the first virtual object or (ii) sensitivity of virtual props in the virtual scene that is the same as the sensitivity of the first parameter policy set.

14. The apparatus according to claim 13, wherein the processing circuitry is further configured to:

display a parameter entry element in the user interaction interface; and display the first parameter policy set associated with the video in response to a trigger operation being performed on the parameter entry element.

15. The apparatus according to claim 13, wherein the processing circuitry is further configured to:

in response to a playing progress of the video reaching a set timestamp, display a parameter policy of the first account in the set timestamp; and in response to a first feature parameter obtained by the first virtual object in the virtual scene being higher than a first feature parameter threshold in an interaction process related to currently played content of the video, display a parameter policy of the first account in the interaction process related to the currently played content, wherein the first feature parameter comprises at least one of:

a first use frequency of the parameter policy applied to the currently played content;

a first interaction activity of the currently played content of the video;

a first score obtained by the first virtual object in the virtual scene;

a first character similarity between the first virtual object and the second virtual object controlled by the second account; or a first environment similarity between an environment in which the first virtual object is located and an environment in which the second virtual object controlled by the second account is located.

16. The apparatus according to claim 13, wherein the processing circuitry is further configured to:

display a parameter policy set of the first account; and in response to a second feature parameter of the first account being less than a second feature parameter of a third account, display a parameter policy set of the third account, wherein the third account is an account that controls a third virtual object to interact with the first virtual object in the virtual scene, and types of the third virtual object comprise:

a virtual object in a same group as the first virtual object in the interaction process, and a virtual object in a different group from the first virtual object in the interaction process.

17. The apparatus according to claim 16, wherein the processing circuitry is further configured to:

perform one of:

displaying only a parameter policy currently applied by the first account in the interaction process;

displaying the parameter policy currently applied by the first account in the interaction process, and a parameter policy previously applied by the first account in the interaction process;

displaying a parameter policy applied by the first account at an end of the interaction process; or displaying the parameter policy currently applied by the first account in the interaction process, the parameter policy previously applied by the first account in the interaction process, and a parameter policy to be applied later by the first account in the interaction process.

18. The apparatus according to claim 13, wherein the first parameter policy set comprises a plurality of sets of parameter policies, the processing circuitry is further configured to apply a differentiated display style to the plurality of sets of parameter policies, a saliency degree of a display style of a respective parameter policy is positively correlated with a first feature parameter obtained by the first virtual object in the virtual scene, and the first feature parameter comprises at least one of:

a first use frequency of the respective parameter policy applied to currently played content of the video;

a first interaction activity of the currently played content of the video;

a first score obtained by the first virtual object in the virtual scene;

a first character similarity between the first virtual object and the second virtual object controlled by the second account; or a first environment similarity between an environment in which the first virtual object is located and an environment in which the second virtual object controlled by the second account is located.

19. The apparatus according to claim 18, wherein the processing circuitry is further configured to:

display a selection control element corresponding to each set of parameter policies in the first parameter policy set; and determine, in response to a trigger operation being performed on of the selection control elements, a parameter policy corresponding to the triggered selection control element as a parameter policy for updating the second parameter policy set.

20. A non-transitory computer-readable storage medium storing instructions which when executed by processing circuitry cause the processing circuitry to perform a parameter processing method for a virtual scene, the method comprising:

playing a video in a user interaction interface of a second account, wherein the video comprises an interaction process in which a first account controls a first virtual object in the virtual scene according to a first parameter policy set that is associated with the video;

displaying, in a secondary user interface displayed with the user interaction interface during playback of the video, the first parameter policy set associated with the video and corresponding to the first account, the first parameter policy set comprising plural parameters including at least one of (i) position, size, or function of keys for controlling the first virtual object in a user interaction interface of the first account or (ii) sensitivity of virtual props in the virtual scene;

receiving a user selection to perform an update based on the first parameter policy set associated with video via a selection control element in the secondary user interface; and updating a second parameter policy set corresponding to the second account based on at least one of the plural parameters of the first parameter policy set associated with the video in response to the user selection to perform the update based on the first parameter policy set, wherein updated parameters of the second parameter policy set include at least one of (i) position, size, or function of keys for controlling a second virtual object in the virtual scene that are the same as the position, size, or function of keys for controlling the first virtual object or (ii) sensitivity of virtual props in the virtual scene that is the same as the sensitivity of the first parameter policy set.

* * * * *